(12) United States Patent
Oyaizu et al.

(10) Patent No.: US 8,031,191 B2
(45) Date of Patent: Oct. 4, 2011

(54) APPARATUS AND METHOD FOR GENERATING RENDERING DATA OF IMAGES

(75) Inventors: Hideki Oyaizu, Tokyo (JP); Seiji Kobayashi, Tokyo (JP); Teruyuki Ushiro, Chiba (JP)

(73) Assignee: Sony Corporation, Tokyo (JP)

(*) Notice: Subject to any disclaimer, the term of this patent is extended or adjusted under 35 U.S.C. 154(b) by 660 days.

(21) Appl. No.: 11/421,150

(22) Filed: May 31, 2006

(65) Prior Publication Data
US 2006/0274079 A1 Dec. 7, 2006

(30) Foreign Application Priority Data

Jun. 2, 2005 (JP) ................. P2005-163270

(51) Int. Cl.
*G06T 15/50* (2006.01)
*G06T 17/00* (2006.01)
*G06T 13/80* (2006.01)
*G09G 5/00* (2006.01)

(52) U.S. Cl. ........ 345/426; 345/428; 345/475; 345/582; 345/611

(58) Field of Classification Search .............. 345/426, 345/428, 582, 611; 375/240, 240.02, 240.16, 375/240.21, 240.24; 382/236
See application file for complete search history.

(56) References Cited

U.S. PATENT DOCUMENTS

| | | | | |
|---|---|---|---|---|
| 4,873,573 A * | 10/1989 | Thomas et al. | .......... | 375/240.16 |
| 5,128,754 A * | 7/1992 | Dhein | .............. | 375/240.11 |
| 5,159,453 A * | 10/1992 | Dhein et al. | .............. | 348/598 |
| 5,241,608 A * | 8/1993 | Fogel | .............. | 382/107 |
| 5,621,468 A * | 4/1997 | Kim | .............. | 375/240.16 |
| 5,659,365 A * | 8/1997 | Wilkinson | .............. | 375/240.15 |
| 5,719,944 A * | 2/1998 | Banerjea | .............. | 381/61 |
| 5,764,872 A * | 6/1998 | Koyamada et al. | .............. | 345/440 |
| 6,064,393 A * | 5/2000 | Lengyel et al. | .............. | 345/427 |
| 6,072,834 A * | 6/2000 | Kim et al. | .............. | 375/240 |

(Continued)

FOREIGN PATENT DOCUMENTS

JP 2002-208027 7/2002

(Continued)

OTHER PUBLICATIONS

Callico, et al., "A low-cost implementation of super-resolution based on a video encoder," IECON 02 [Industrial Electronics Society, IEEE 2002 28th Annual Conference of the], vol. 2, pp. 1439-1444, Nov. 5-8, 2002.*

Hae-Kwan Jung; Chun-Pyo Hong; Jin-Soo Choi; Yeong-Ho Ha, "A VLSI architecture for the alternative subsampling-based block matching algorithm," Consumer Electronics, IEEE Transactions on, vol. 41, No. 2, pp. 239-247, May 1995.*

(Continued)

*Primary Examiner* — Ulka Chauhan
*Assistant Examiner* — Roberta D Prendergast
(74) *Attorney, Agent, or Firm* — SNR Denton US LLP

(57) ABSTRACT

An image processing apparatus for sequentially generating rendering data of a plurality of images composing a moving image, comprising a velocity vector detecting unit for detecting a velocity vector of a block image in an image in accordance with the rendering data based on rendering basic data used for the generation of the rendering data and a control unit for selectively performing, for each of the block images of the rendering data and based on a velocity vector generated by the velocity vector detecting unit, subsampling processing for generating only part of the pixel data in the pixel data corresponding to the block image based on the rendering basic data and non-subsampling processing for generating all pixel data corresponding to the block image based on the rendering basic data to thereby generate the rendering data.

9 Claims, 30 Drawing Sheets

U.S. PATENT DOCUMENTS

| | | | | |
|---|---|---|---|---|
| 6,128,041 A * | 10/2000 | Han et al. | ............... | 375/240.12 |
| 6,147,718 A * | 11/2000 | Takashima et al. | ........... | 348/699 |
| 6,243,106 B1 * | 6/2001 | Rehg et al. | ............ | 345/473 |
| 6,256,418 B1 * | 7/2001 | Rehg et al. | ................ | 382/236 |
| 6,288,722 B1 * | 9/2001 | Narayanaswami | .......... | 345/619 |
| 6,940,557 B2 * | 9/2005 | Handjojo et al. | ............ | 348/452 |
| 7,317,839 B2 * | 1/2008 | Holcomb | ................ | 382/236 |
| 2002/0171759 A1 * | 11/2002 | Handjojo et al. | ............ | 348/452 |
| 2005/0128307 A1 * | 6/2005 | Kobayashi et al. | ....... | 348/208.1 |
| 2005/0232514 A1 * | 10/2005 | Chen | ............... | 382/298 |
| 2005/0259740 A1 * | 11/2005 | Kobayashi et al. | ...... | 375/240.16 |
| 2006/0274075 A1 * | 12/2006 | Yamazaki et al. | ........... | 345/543 |

FOREIGN PATENT DOCUMENTS

| | | |
|---|---|---|
| JP | 2002-229547 | 8/2002 |
| JP | 2004-086508 | 3/2004 |
| WO | 00/07364 | 2/2000 |
| WO | 02/01505 | 1/2002 |

OTHER PUBLICATIONS

Liu, B.; Zaccarin, A., "New fast algorithms for the estimation of block motion vectors," Circuits and Systems for Video Technology, IEEE Transactions on , vol. 3, No. 2, pp. 148-157, Apr. 1993.*

Elliger, B., "Analysis of motion compensated filters concerning motion correctness and accuracy," Signal Processing. Image Communication, Elsevier Science Publishers, Amsterdam, NL, vol. 14, No. 9, Jul. 1999, pp. 697-720.*

Broida, T.J.; Chellappa, R.; , "Experiments and uniqueness results on object structure and kinematics from a sequence of monocular images," Proceedings Workshop on Visual Motion, 1989, pp. 21-30, Mar. 20-22, 1989.*

Smith, Russell, May 29, 2004, "The Open Dynamics Engine V0.5 User Guide", 96 pages, http://ode.org.*

Japanese Office Action issued on Oct. 19, 2010 in connection with counterpart JP Appl. No. 2005-163270.

* cited by examiner

APPARATUS AND METHOD FOR GENERATING RENDERING DATA OF IMAGES

CROSS REFERENCES TO RELATED APPLICATIONS

The present invention contains subject matter related to Japanese Patent Application No. 2005-163270 filed in the Japan Patent Office on Jun. 2, 2005, the entire contents of which being incorporated herein by reference.

BACKGROUND OF THE INVENTION

1. Field of the Invention

The present invention relates to an image processing apparatus for processing moving images, a method of the same, and a program and a storage medium of the same.

2. Description of the Art

Computer graphics (CG) technology is widely used in games, movies, advertisements, TV, etc. CG rendering is a technique for mapping CG data existing in a virtual three-dimensional space on a virtual screen for display. The main CG rendering techniques includes the Z-buffer method, the scanline method, the raytracing method, the radiocity method, etc.

For example the raytracing method designates an object nearest the eye in CG data existing on an extension of a straight line (ray) heading from the eye toward a pixel on a screen as the result of rendering. Further, by setting a reflectance, transmittance, refractive index, etc. in the CG data, retracing light from an intersection of a line of sight and the object, and reflexively repeating the reflection and refraction, a transparent object, a reflecting object, etc. can be simulated. Therefore, there is the characteristic that a high quality rendering result can be prepared. On the other hand, the raytracing method had the problem that when reflection, refraction, and other processing increased, the rays branched, therefore the processing became enormous. In particular, when producing CG animation, the rendering time is a big problem, so the bounding volume method, the space division method, and other techniques for increasing the speed have been developed.

These speed-increasing techniques mainly speed up the calculation of the intersection of a ray running from the eye through each pixel with an object on three-dimensional coordinates.

The bounding volume method is a technique of covering a rendering object having a complex shape requiring a long time for intersection judgment by an object enabling intersection judgment at a high speed, for example, a cube, and performing the intersection judgment with respect to that object in advance.

The space division method divides a three-dimensional space into box cells and advance and registers which object belongs to each box cell. This technique sequentially inspects only the box cells through which a ray passes from the one nearest the start point of the ray and performs detailed intersection judgment only for objects registered in those box cells, thereby increases the speed.

Further, as a speed-increasing technique on a two-dimensional plane, the method is known of having the user designate regions required at the time of a final output in a rendered image while viewing a preview and rendering only the designated regions at the time of the main rendering so as to eliminate unused useless rendering parts and increase the speed.

As specific related art, there is Japanese Patent Publication (A) No. 2000-20746.

Summarizing the issue to be handled in the present invention, the conventional speed-increasing methods are speed-increasing techniques in three-dimensional space. The main methods rely on the rendering technique. For example, it was not possible to utilize the speed-increasing technique of intersection judgment of a ray by the bounding volume method as is for the scanline method. The user had to previously designate the regions to be rendered. Further, the rendering time of the regions to be rendered was not reduced. In addition, for high quality rendering with a high frame rate, a large calculation power is necessary, so a further increase in the speed of algorithms has been desired.

SUMMARY OF THE INVENTION

In the present invention, it is therefore desirable to provide an image processing apparatus able to reduce the amount of processing accompanying rendering, a method of the same, and a program and a storage medium of the same.

According to a first aspect of the invention, there is provided an image processing apparatus for sequentially generating rendering data of a plurality of images composing a moving image, comprising a velocity vector detecting device for detecting a velocity vector of a block image in an image in accordance with the rendering data based on rendering basic data used for the generation of the rendering data and a control device for selectively performing, for each of the block images of the rendering data and based on a velocity vector generated by the velocity vector detecting device, sub-sampling processing for generating only part of the pixel data in the pixel data corresponding to the block image based on the rendering basic data and non-subsampling processing for generating all pixel data corresponding to the block image based on the rendering basic data to thereby generate the rendering data.

According to a second aspect of the invention, there is provided an image processing method for sequentially generating rendering data of a plurality of images composing a moving image, comprising a first step of detecting a velocity vector of a block image in an image in accordance with the rendering data based on a rendering basic data used for the generation of the rendering data and a second step of selectively performing, for each of the block images of the rendering data and based on the velocity vector generated in the first step, subsampling processing for generating only part of the pixel data in the pixel data corresponding to the block image based on the rendering basic data and non-subsampling processing for generating all pixel data corresponding to the block images based on the rendering basic data to thereby generate the rendering data.

According to a third aspect of the invention, there is provided a program executed by an image processing apparatus for sequentially generating rendering data of a plurality of images composing a moving image, comprising a first routine of detecting a velocity vector of a block image in an image in accordance with the rendering data based on rendering basic data used for the generation of the rendering data and a second routine of selectively performing, for each of the block images of the rendering data and based on the velocity vector generated in the first routine, subsampling processing for generating only part of the pixel data in the pixel data corresponding to the block image based on the rendering basic data and non-subsampling processing for generating all pixel data corresponding to the block images based on the rendering basic data to thereby generate the rendering data.

According to a fourth aspect of the invention, there is provided a storage medium storing a program run by an image processing apparatus for sequentially generating rendering data of a plurality of images composing a moving image, wherein the program makes the image processing apparatus execute a first routine of detecting a velocity vector of a block image in an image in accordance with the rendering data based on rendering basic data used for the generation of the rendering data and a second routine of selectively performing, for each of the block images of the rendering data and based on the velocity vector generated in the first routine, subsampling processing for generating only part of the pixel data in the pixel data corresponding to the block image based on the rendering basic data and non-subsampling processing for generating all pixel data corresponding to the block images based on the rendering basic data to thereby generate the rendering data.

According to the present invention, an image processing apparatus able to reduce the amount of processing accompanying rendering in comparison with a conventional apparatus, a method of the same, and a program and a storage medium of the same can be provided.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Below, an image processing apparatus according to an embodiment of the present invention will be explained.

<Visual Characteristic and Super-resolution Effect in Present Embodiment>

First, the visual characteristic and super-resolution effect in the present embodiment will be explained.

Human vision functions to perceive light when the sum of stimulus of received light reaches a certain threshold value (hereinafter referred to as a "temporal integration function"). Namely, light is perceived according to the sum of light integrated in terms of time irrespective of the state of distribution state of stimulus of light within a certain duration. Further, stimulus enabling the perception of light (threshold value) becomes smaller the longer the stimulus duration, while becomes larger the shorter the duration.

This relationship is known as Bloch's law. The following equation stands. In equation, I is an intensity of the stimulus as the threshold value, T is the duration of the stimulus, and $\underline{k}$ is a constant.

$$I \times T = k$$

Figure 1:
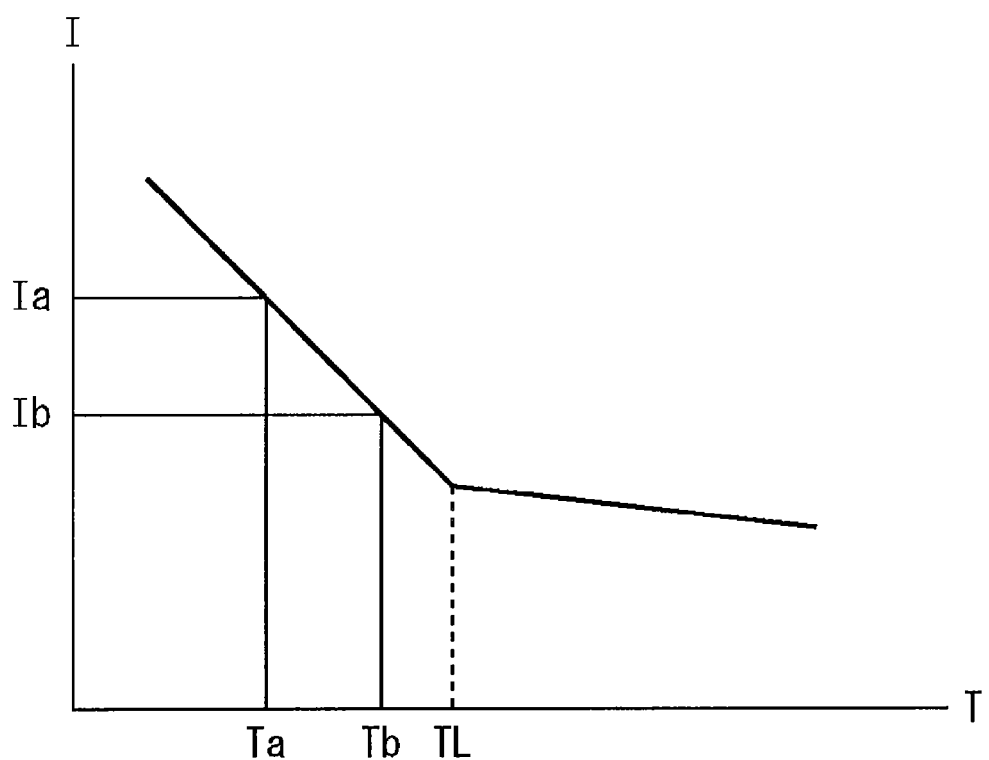
FIG. 1 is a graph for explaining Bloch's law.

Further, this relationship can be expressed as in FIG. 1 where the abscissa indicates the stimulus duration T, and the ordinate indicates the threshold value (intensity I). This curve is known as a threshold duration curve. According to the threshold duration curve of FIG. 1, a person senses the same brightness in a case where light having an intensity Ia is presented for a time Ta pulse wise and a case where light having an intensity Ib which is 1/n of Ia is continuously presented for exactly a time Tb which is $\underline{n}$ times Ta.

Note that, up to a certain time of duration of stimulus (time TL in the example of FIG. 1), Bloch's law stands (line heads down to the right up to the time TL), but when exceeding the time TL, the threshold value begins to depend upon only the intensity of the stimulus (it no longer changes according to the duration and as a result the threshold duration curve becomes a bent line). The maximum stimulus duration TL during which Bloch's law stands is called the "critical duration".

This time TL changes according to the stimulus conditions such as the intensity of the background light and is reported to be about 25 ms to 100 ms.

Details of Bloch's law are described in for example *Vision Information Processing Handbook*, edited by Japan Vision Society, pp. 219-220.

Human vision further functions to store stimulus for a certain time when perceiving stimulus even after the presentation of the stimulus ends (hereinafter, referred to as a "sensory memory"). For this time, many reports such as 10 ms to 200 ms have been made. This function is also called "iconic memory" or "visual persistance" and is described in for example *Vision Information Processing Handbook*, edited by the Japan Vision Society, pp. 229-230.

Next, the resolution effect realized based on the visual characteristics will be explained. Note that the super-resolution effect in the present embodiment utilizes the visual characteristic that an observer perceives a plurality of images added together within a certain time. This is believed to be caused because of the complex relationship of the temporal integration function and the sensory memory, but in the following explanation, for convenience, it is assumed that this is due to the temporal integration function.

Figure 2C:
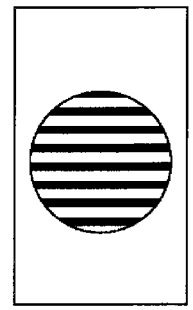
FIGS. 2A to 2C are diagrams for explaining the principle of resolution conversion.
Figure 2B:
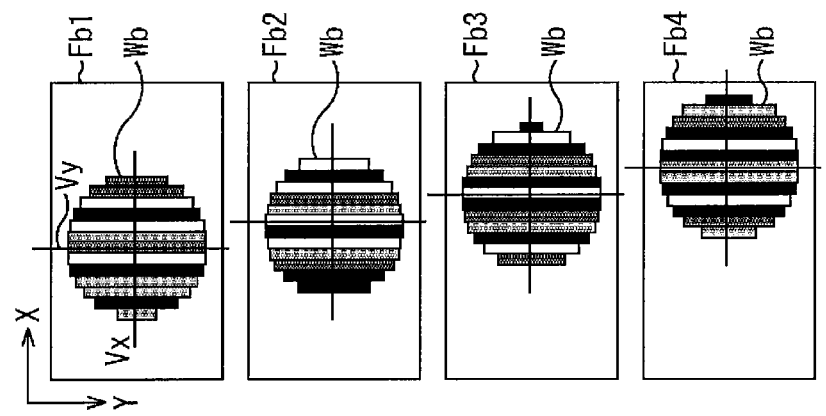
Figure 2A:
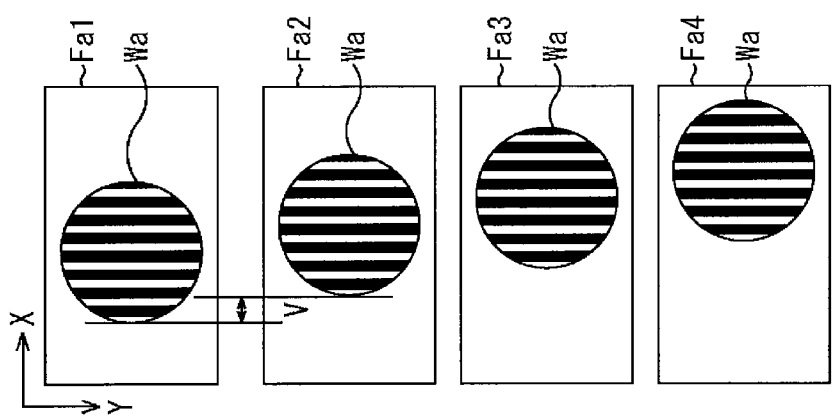

For example, when a subject moving parallel to the horizontal direction is captured by a predetermined frame rate (hereinafter referred to as an "input image frame rate") and a predetermined sampling rate (hereinafter referred to as an "input image sampling rate"), an input frame Fa in which a subject image Wa moves to a right direction when facing the drawing (X-axis direction) at a velocity v (pixel/frame) as shown in FIG. 2A) is obtained. In FIG. 2A, four consecutive input frames Fa1 to Fa4 are shown.

Assume that the input frames Fa obtained in this way are ones which are sampled in the X-axis direction (direction of movement of the subject image Wa) with a sampling rate (hereinafter, referred to as a "display image sampling rate") which is 1/m of the input image sampling rate (assume that the subsampling is carried out with a subsampling amount m). In the case of FIG. 2A, the input frames Fa are thinned by a subsampling amount 4, therefore display frames Fb as shown in FIG. 2B in which the number of pixels in the X-axis direction becomes ¼ (becomes rough in the X-axis direction) (the image quality is deteriorated) are obtained. The display frames Fb include images obtained by the subsampling of the subject images Wa of the input frames Fa by the subsampling amount 4 (hereinafter referred to as the "display subject images Wb").

Next, assume that the display frames Fb obtained in this way are displayed by a predetermined frame rate (hereinafter, referred to as a "display image frame rate"). As a result, the observer perceives an integrated image of the plurality of display frames Fb displayed within the integration time in the above temporal integration function.

Assume here that the line of sight of the observer follows the display subject images Wb on the display frames Fb displayed in this way. In this case, the line of sight of the observer is always located at the centers of the displayed subject images Wb, therefore the display subject images Wb on the retina of the observer are substantially stationary. The coordinate axes Vx and Vy shown in FIG. 2B indicate coordinates on the retina, while the coordinate axes X and Y indicate coordinates on the frame (both of them are shown on a display frame Fb1 in the figure, but illustration is omitted for the display frames Fb2 to Fb4). The coordinate axes Vx and Vy become reverse to X and Y in the orientation of the coordinate system since a reversed image of a real image is formed on the retina.

Figure 3:
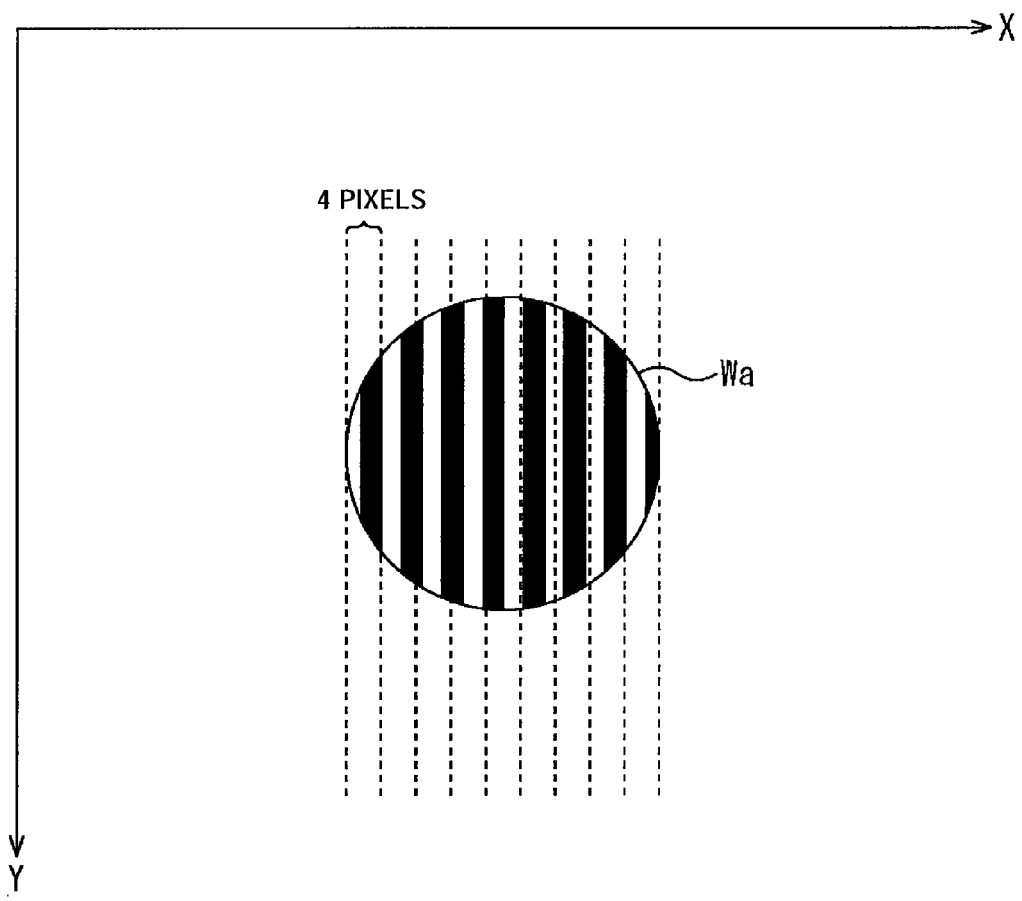
FIG. 3 is a diagram for explaining a sampling position.

Further, in the sampling of the display frames Fb, as indicated by a dotted line in FIG. 3, constant positions on the frames (positions at intervals of 4 pixels in the case of this example) are sampled. Accordingly, when the amount of movement does not coincide with a multiple of the sampling interval, the positions of the sampled subject images Wa are shifted by v increments for each frame, therefore each display subject image Wb of the display frame Fb is formed in a portion different from the subject image Wa by exactly the amount of deviation of the sampling position.

For example, when the movement velocity v of the subject images Wa is 1 (pixel/frame), the amount of movement between frames (1 pixel) does not coincide with the multiple of the sampling interval (4 pixels). The positions of the sampled subject images Wa are shifted by 1 pixel increments in the X-axis direction. Accordingly, in this case, each display subject image Wb of the display frame Fb is formed at a portion different from the subject image Wa by exactly that amount.

When the display subject images Wb are formed from parts different from the subject images Wa by exactly the amount of deviation of the sampling position in this way, the integration of the display subject images Wb over a plurality of frames in the visual system enables an image in which pixels become denser than the display subject images Wb (image of higher resolution than resolution of display subject images Wb (hereinafter referred to as a "super-resolution")) to be perceived.

For example, when the integration time in the visual characteristics corresponds to the display time of four display frames Fb in FIG. 2B, and four display subject images Wb of the display frames Fa1 to Fa4 are integrated, an image as shown in FIG. 2C having a resolution about four times the resolution of the display subject images Wb, that is, a resolution of the same extent as that of the subject images Wa is perceived.

The super-resolution effect is realized by this principle, but when subsampling is applied, alias components are generated. This results in folded distortion resulting in deterioration of the image quality. Therefore, in the present embodiment, as explained below, means are employed to eliminate the alias components.

Equation (1) shows a signal fs(x) obtained by discrete representation of a one-dimensional original signal f(x) by an interval X. In equation (1), $\delta(x)$ is a delta function. Equation (2) shows a Fourier transform Fs($\omega$) of the discrete signal fs(x). In equation (2), F($\omega$) is the Fourier transform of the original signal f(x), and $\omega s$ represents a sampling angle frequency.

$$f_s(x) = \sum_{k=-\infty}^{\infty} f(kX)\delta(x - kX) \quad (1)$$

$$F_s(\omega) = \frac{1}{X} \sum_{k=-\infty}^{\infty} F(\omega - k\omega_s) \quad (2)$$

Equation (3) shows a Fourier Transform Fs$\phi$($\omega$) of a signal fs$\phi$(x) obtained by discrete representation of the original signal f(x) by the interval X by shifting it by exactly $\phi$ in real space.

$$F_{s\phi}(\omega) = \frac{1}{X} \sum_{k=-\infty}^{\infty} F(\omega - k\omega_s) e^{-j2\pi k\phi} \quad (3)$$

Equation (3) shows that a base wave of k=0 becomes the same as the original signal, and the phase of an n-th order harmonic of k=n is shifted by exactly $2\pi n\phi$. As explained above, when assuming that the subject images Wa move in parallel by a certain movement velocity v and considering a case of subsampling sampling by 1/m in the movement direction, the original signal has a bandwidth m times the Nyquist frequency of the display frames Fb. Accordingly, the sampling signal $fs\phi(x)$ thinned by 1/m has alias components. In equation (3), k=0 becomes the original signal component, and k=1, 2, ..., (m-1) become the alias components.

Figure 4:
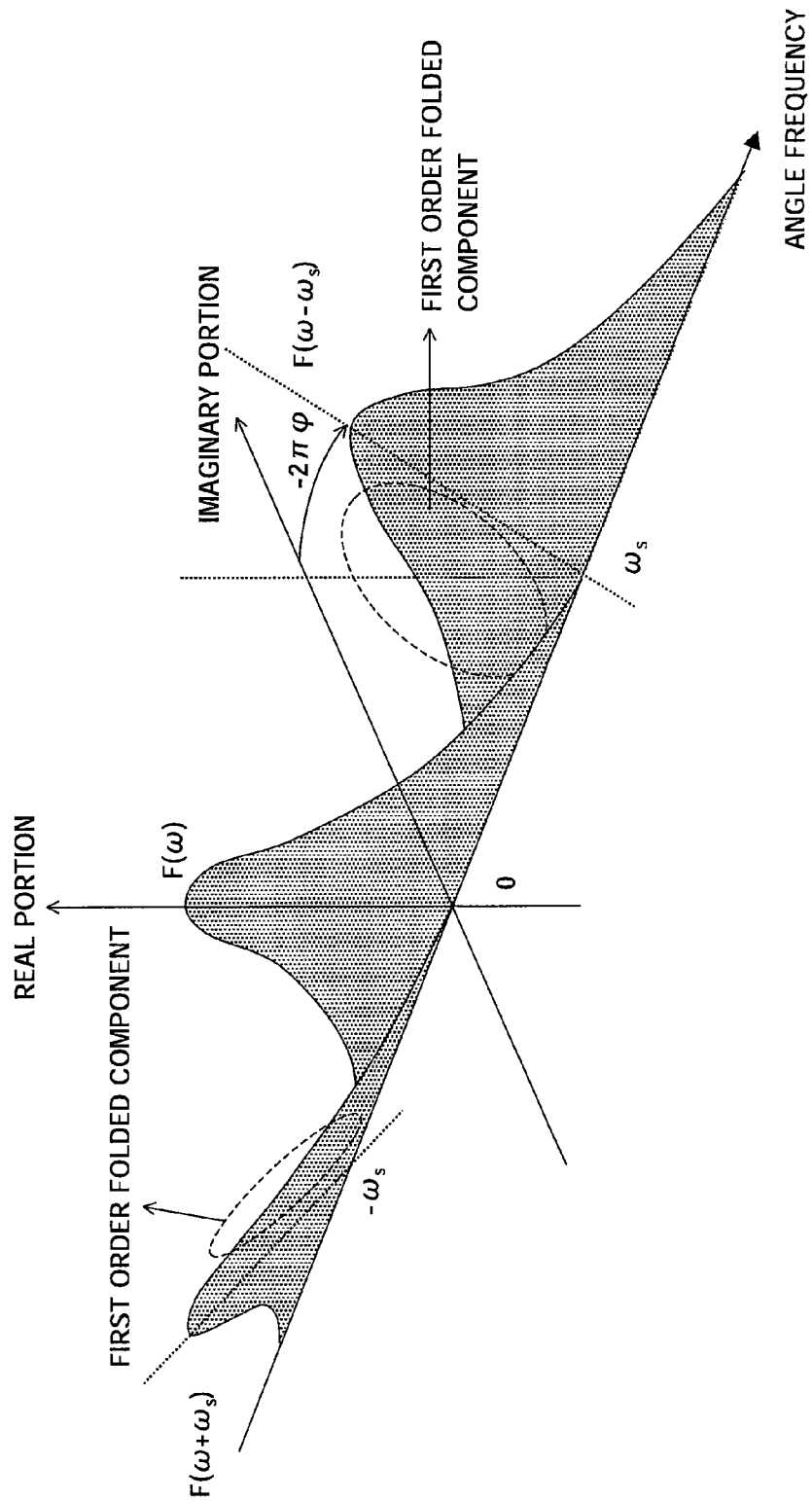
FIG. 4 is a diagram for explaining an alias component.

FIG. 4 shows the Fourier Transform $Fs\phi(\omega)$ when the subsampling amount m is made equal to 2. At this time, the bandwidth of the original signal becomes twice the Nyquist frequency, and there are alias components of first order harmonics in the sampling signal $fs\phi(x)$ thinned by 1/m. As seen from this figure, the sampling signal $fs\phi(x)$ has Fourier Transform $F(\omega)$ components of the original signal $f(x)$ as they are. The first order harmonics $F(\omega-\omega s)$ and $F(\omega+\omega s)$ when k=1 are folded with phase deviations by exactly $-2\pi\phi$ and $2\pi\phi$.

When the subsampling sampling interval is 1/m, there are alias components of the 1 to (m−1)th order in the sampling signal $fs\phi(x)$ thinned by that 1/m. This means that each phase is deviated by exactly $2\pi k\phi$. This sampling signal $fs\phi(x)$ is a signal obtained by subsampling and sampling the original signal $f(x)$ deviated by exactly $\phi$ to 1/m, therefore is considered to correspond to any one display frame Fb in FIG. 2B.

Here, consider signals of display frames Fb different in terms of time in FIG. 2B. When the subject (original signal $f(x)$) moves in parallel at the velocity v, as shown in FIG. 3, the phase of the sample point deviates for each frame. From this fact, the amount of deviation $\phi$ of a sampling point in equation (3) becomes a function of a time t and becomes like in equation (4) dependent upon the velocity v (pixel/frame) and the subsampling amount m (pixel). T in equation (4) represents the time interval and is a reciprocal of the frame rate $$\phi_t = \frac{v}{m} \frac{t}{T} \quad (4)$$

Figure 5:
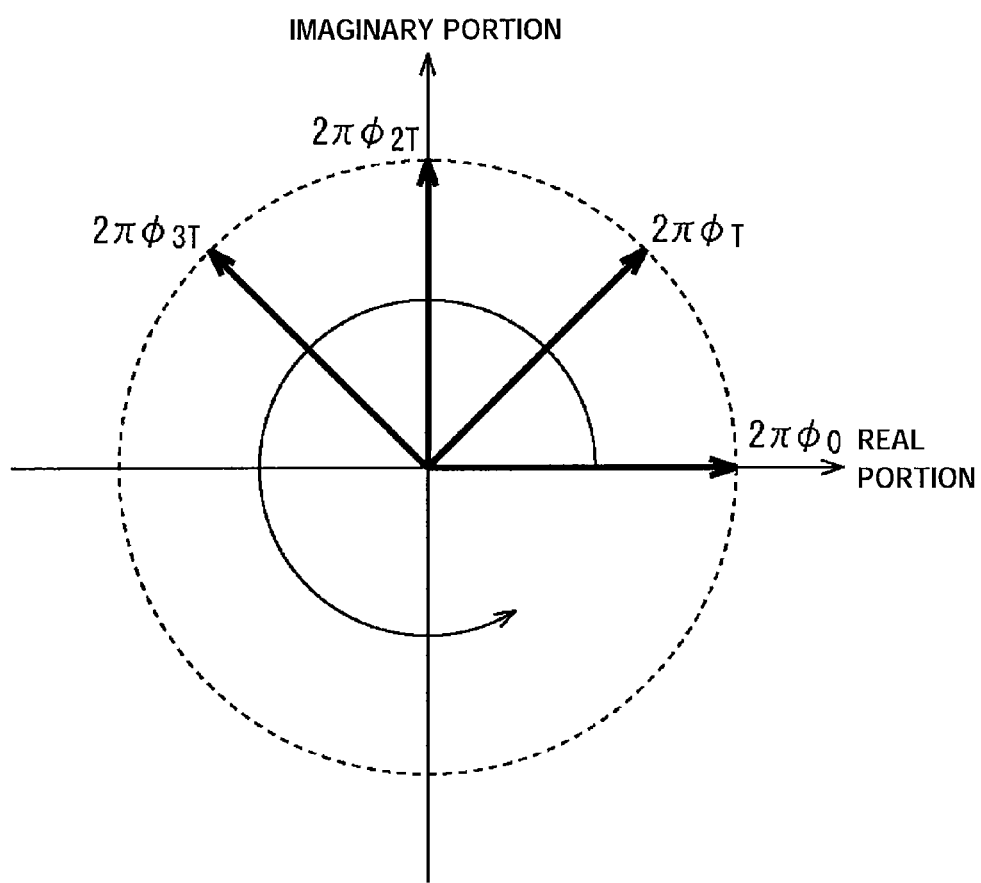
FIG. 5 is a diagram for explaining a change of phase of an alias component.
Figure 6:
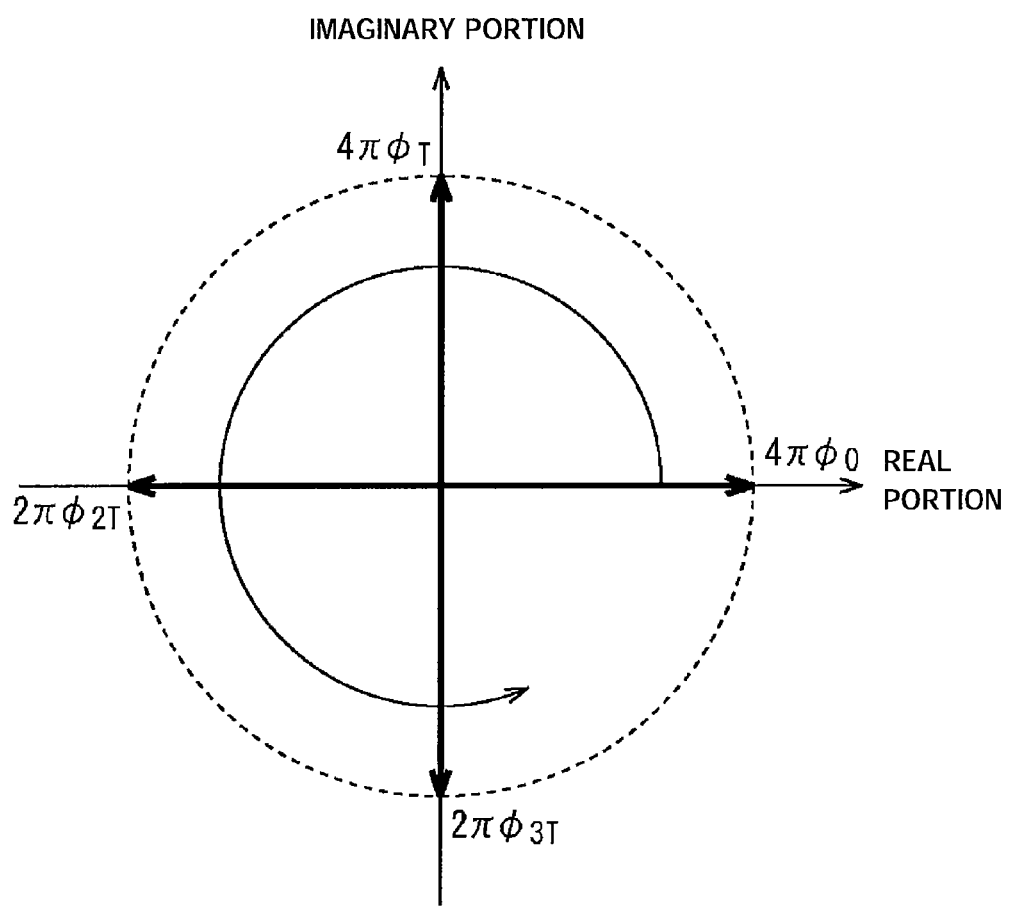
FIG. 6 is another diagram for explaining a change of phase of an alias component.
Figure 7:
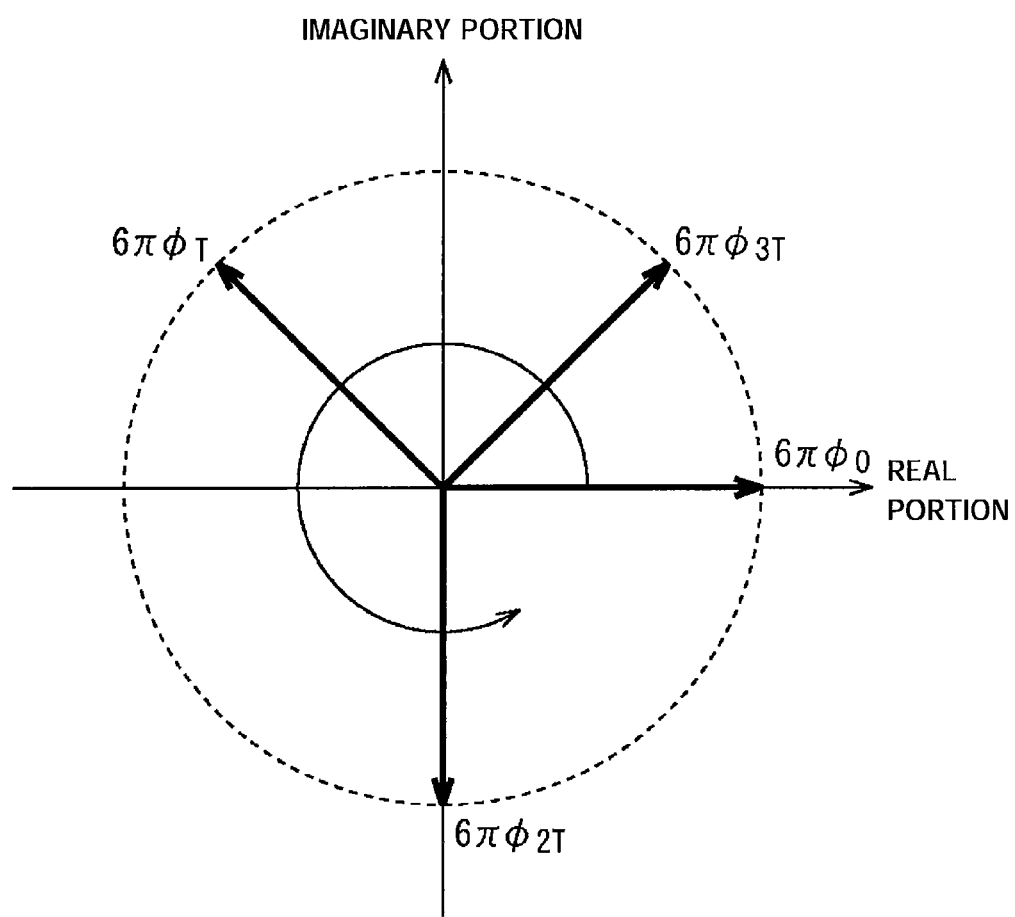
FIG. 7 is another diagram for explaining a change of phase of an alias component.
Figure 8:
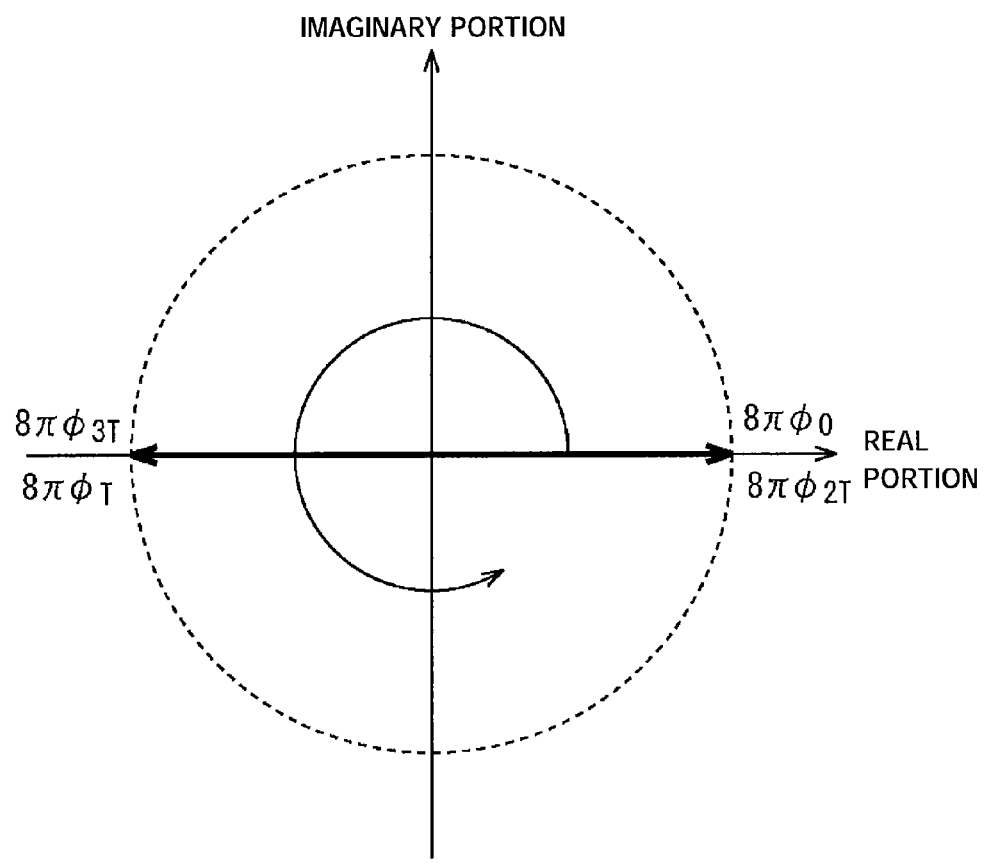
FIG. 8 is another diagram for explaining a change of phase of an alias component.

Equation (4) shows that the amount of deviation $\phi 0$ becomes 0 when t=0 and the amount of deviation increases by v/m increments as t changes such as t=T, 2T, 3T . . . . When applying equation (4) to equation (3), the phase of the alias component at each time is found. FIG. 5 shows phases of the first order alias component when t=0, T, 2T, 3T . . . . FIG. 6 shows phases of the second order alias component, FIG. 7 shows phases of the third order alias component, and FIG. 8 shows phases of the fourth order alias component at the time t=0, T, 2T, 3T . . . .

In this way, the k-th order alias component rotates at an equal interval (interval of $2\pi k\phi T$) along with the time, that is, as the frame advances, and returns to the phase 0 when time t=(m/v)T. Further, as the order of the alias component rises, the rotation interval of the phase is doubled.

The k (=1, 2, . . . , (m−1))-th order alias component generated by the subsampling (subsampling and sampling) by the subsampling amount m rotates by $2\pi k\phi T$ in this way, therefore there is a case where alias components are cancelled by each other according to the direction of the phase and the number of integrated images (number of combined alias components). In other words, $\phi t$ depends upon the movement velocity v and the subsampling amount m as shown in equation (4), therefore there is a case where the alias components are cancelled by each other according to the movement velocity v, the subsampling amount m, and the number of integrated images.

Figure 9:
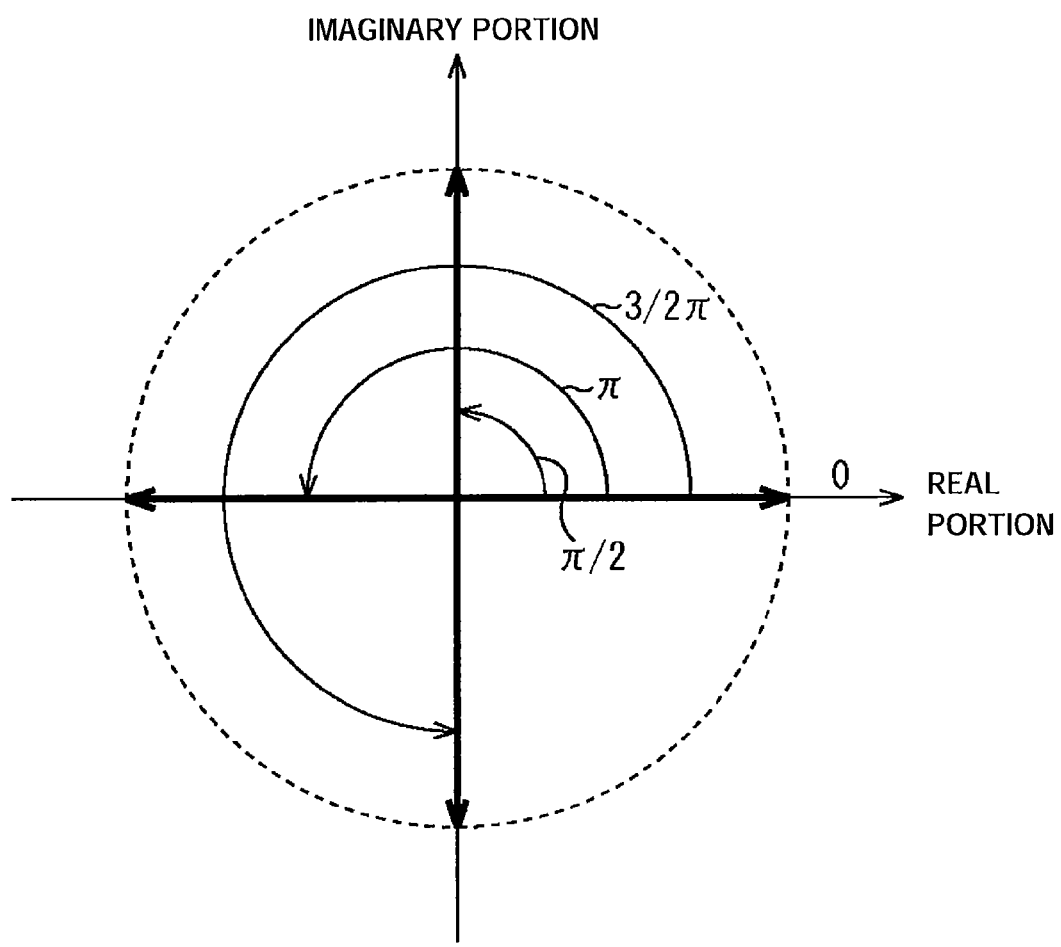
FIG. 9 is another diagram for explaining a change of phase of an alias component.

For example, when v=1, when the subsampling is carried out by m=4, in the images of the display frames Fb, as shown in FIG. 9, there is a first order alias component changing in phase like $0(=2\pi\times1\times[(1/4)\times0/T])$, $\pi/2(=2\pi\times1\times[(1/4)\times(T/T)]$, $\pi(=2\pi\times1\times[(1/4)\times2T/T]$, $3/2\pi(=2\pi\times1\times[(1/4)\times3T/T])$, . . . (changing in phase at the interval of $\pi/2$). Note that, in FIG. 9, the illustration of the alias components at t=4t and later is omitted. The same is true also in FIG. 10 and FIG. 11 explained later.

Figure 10:
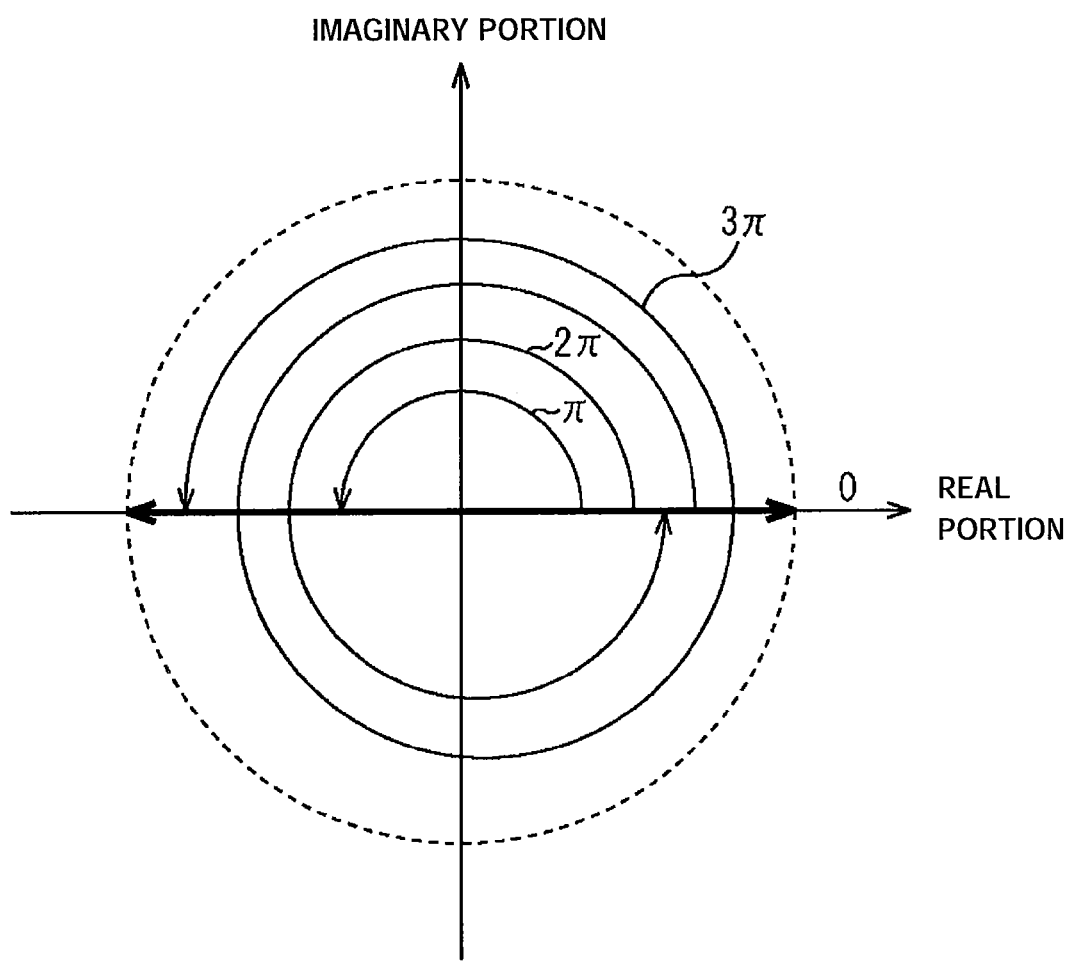
FIG. 10 is a diagram for explaining a rotation interval of a phase of an alias component.
Figure 11:
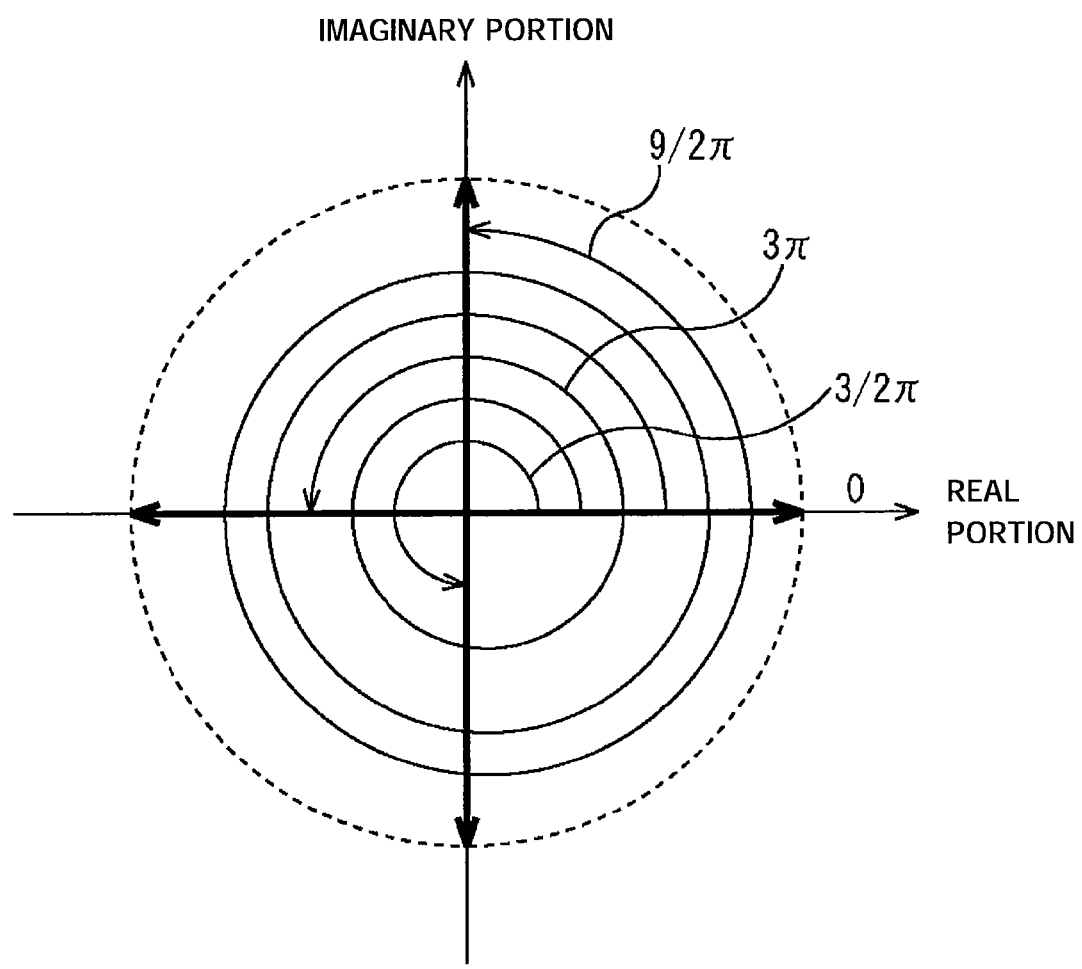
FIG. 11 is a diagram for explaining the rotation interval of a phase of an alias component.

In the images of the display frames Fb, further, as shown in FIG. 10, there is a second order alias component changing in phase like $0(=2\pi\times2\times[1/4\times0/T])$, $\pi(=2\pi\times2\times[1/4\times T/T]$, $2\pi(=2\pi\times2\times[(1/4)\times2T/T)])$, $3\pi(=2\pi\times2\times[(1/4)\times3T/T])$, . . . (changing in phase at the interval of $\pi$), and, as shown in FIG. 11, a third order alias component changing in phase like $0(=2\pi\times3\times[(1/4)\times(0/T)]$, $3\pi/2$ $(=2\pi\times3\times[(1/4)\times(T/T)]$, $3\pi(=2\pi\times3\times[(1/4)\times(2T/T)])$, $9\pi/2(=2\pi\times3\times[(1/4)\times(3T/T)])$, . . . (changing in phase at the interval of $3\pi/2$).

In this case, vectors of the first to third order alias components at t=0, T, 2T, 3T are oriented in directions canceling each other out as shown in FIG. 9 to FIG. 11, therefore when four display frames Fb are integrated in the vision system, these are all cancelled out.

When expressing the condition where the k-th order alias components are cancelled out by an equation, the result becomes equation (5). When developing equation (5) by Euler's equation, the result become equations (6) and (7).

$$\sum_t e^{j2\pi k\phi_t} = 0 \quad (5)$$

$$\sum_t \cos(2\pi k\phi_t) = 0 \quad (6)$$

$$\sum_t \sin(2\pi k\phi_t) = 0 \quad (7)$$

Namely, in the present embodiment, by determining the subsampling amount m so as to generate alias components canceling each other out in accordance with the movement velocity v of the subject images Wa, the alias components are eliminated.

Figure 12:
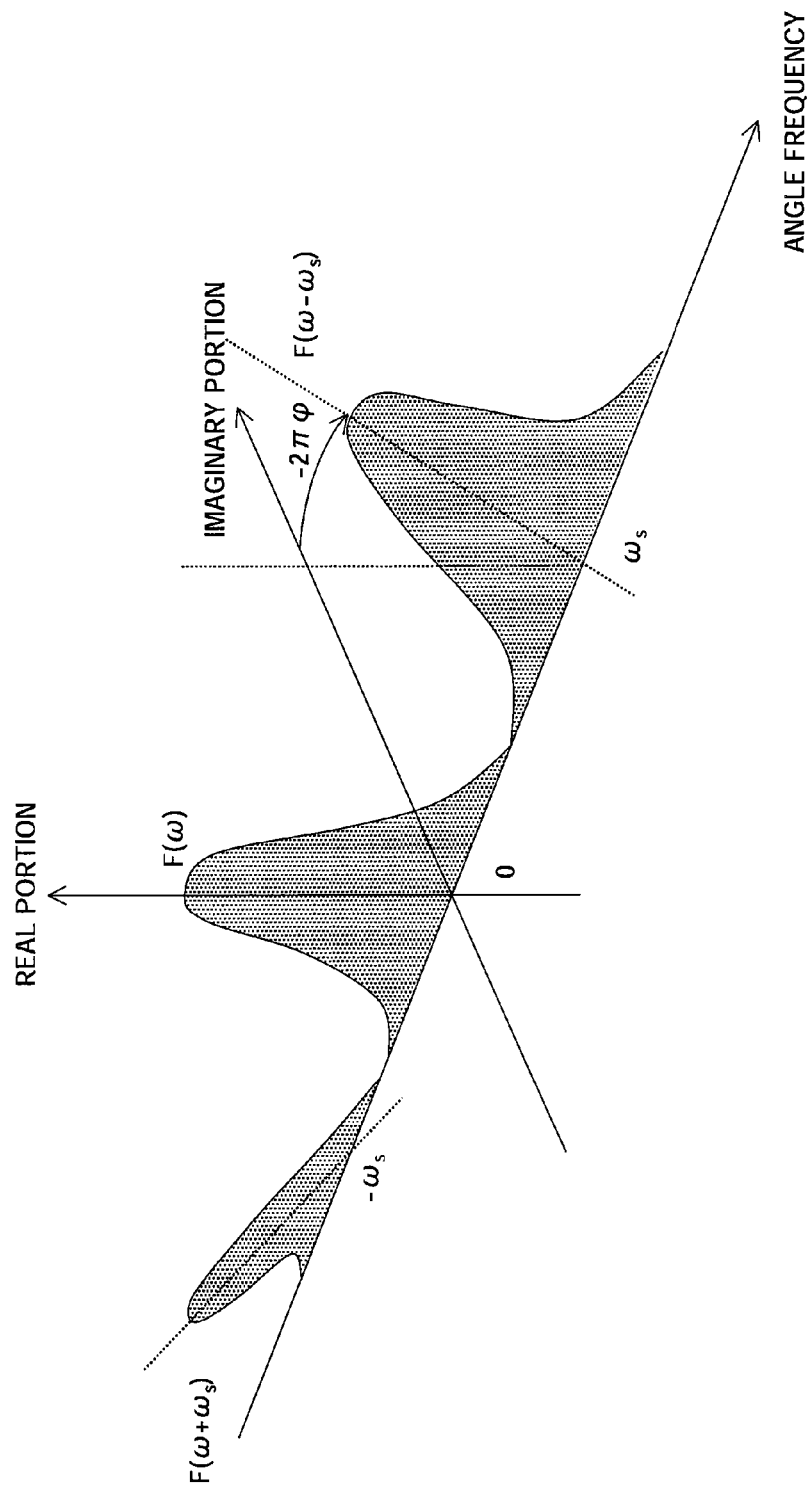
FIG. 12 is another diagram for explaining an alias component.

Here, when considering the case where the discrete signal $fs\phi(x)$ is reduced to 1/m by a bandwidth restriction type digital filter, the original signal $f(x)$ deviated by exactly $\phi$ is band-restricted in the Nyquist frequency so as not to generate folds. For this reason, for example, when m=2, the Fourier space becomes as shown in FIG. 12, and each frame image corresponding to the signal reduced to 1/m becomes an image not including any alias component and having a low resolution. Accordingly, in this case, the base wave of the reduced signal becomes a signal different from the original signal. Even when images of a plurality of frames are subjected to additional processing, a frequency component more than the Nyquist frequency cannot be expressed, and the super-resolution effect cannot be obtained. Accordingly, from this fact, in order to obtain the super-resolution effect, it is important not to restrict the bandwidth of the original signal. Optimally, the original images having space frequency components in a wide bandwidth are thinned and sampled.

Note that, in the above description, for simplification, the explanation was given by taking as an example the case where the original signal was a one-dimensional signal, but the same is true also for a two-dimensional image. Further, the explanation was given by taking as an example the movement of the subject image Wa in the X-axis direction with reference to FIG. 2, but the same is true also for movement in the Y-axis direction.

Next, an explanation will be given of the condition of the alias components cancelled out by each other (condition of alias components of images enabling the super-resolution effect).

Figure 13:
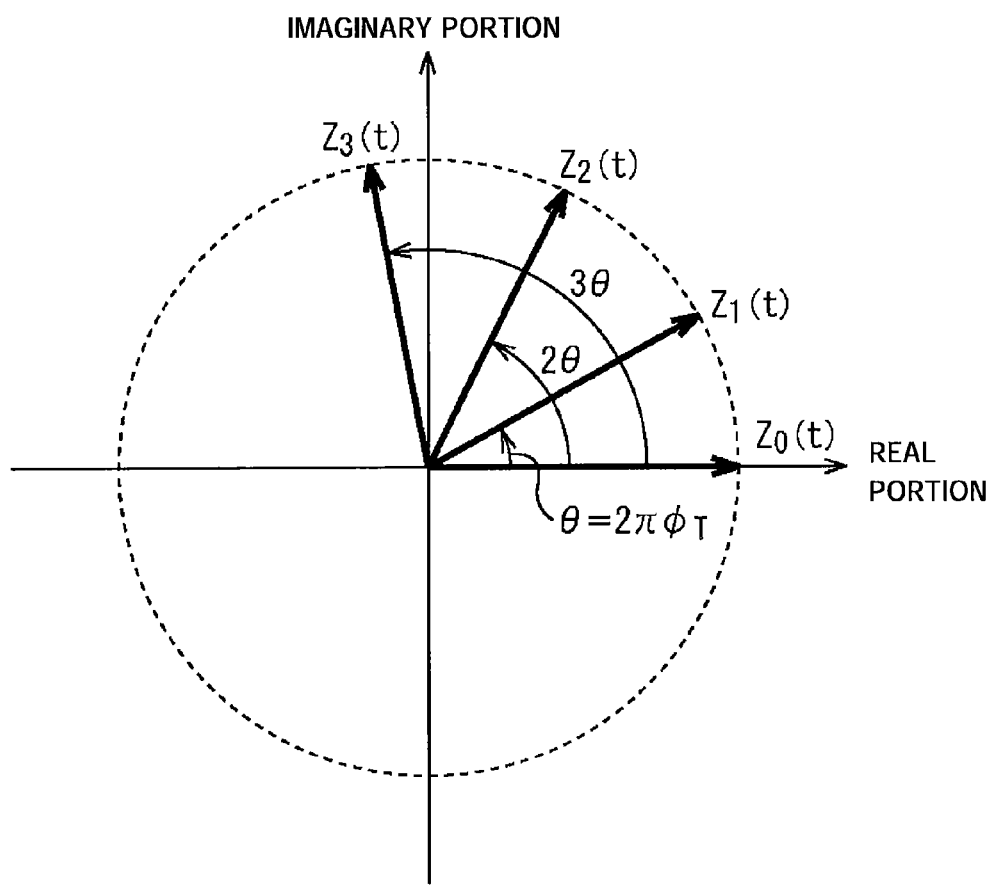
FIG. 13 is another diagram for explaining a rotation interval of a phase of an alias component.

The condition enabling the super-resolution effect is that equation (5) stands, that is, equation (6) and equation (7) stand. This means that, as shown in FIG. 13, when the k-th order alias component at the time t is a vector Zk(t), the sum of the vectors Zk(t) within the integration range of the vision system becomes zero. The establishment of this condition depends upon the integration time, but it is known that this integration time changes according to the observation environment. In addition, it is difficult to correctly measure that, therefore it is difficult to limit the range satisfying this condition.

On the other hand, for example, as seen from an experiment wherein the subject images Wa moving in the X-axis direction or the Y-axis direction at the predetermined movement velocity v are sampled with the predetermined subsampling amount $\overline{m}$ and displayed for each predetermined frame rate and it is confirmed if the displayed display subject images Wb can be perceived with a super-resolution when the observer actually views them, if the frame rate is high, that is, the number of integrated images is large, the super-resolution effect is obtained even when the subsampling amount $\overline{m}$ becomes large. At this time, the condition enabling the super-resolution effect depends upon the movement velocity v and is considered to be in the relationship as in equation (8).

$$2\pi n + \alpha \leq 2\pi k\phi T \leq 2\pi(n+1) - \alpha \tag{8}$$

Figure 14:
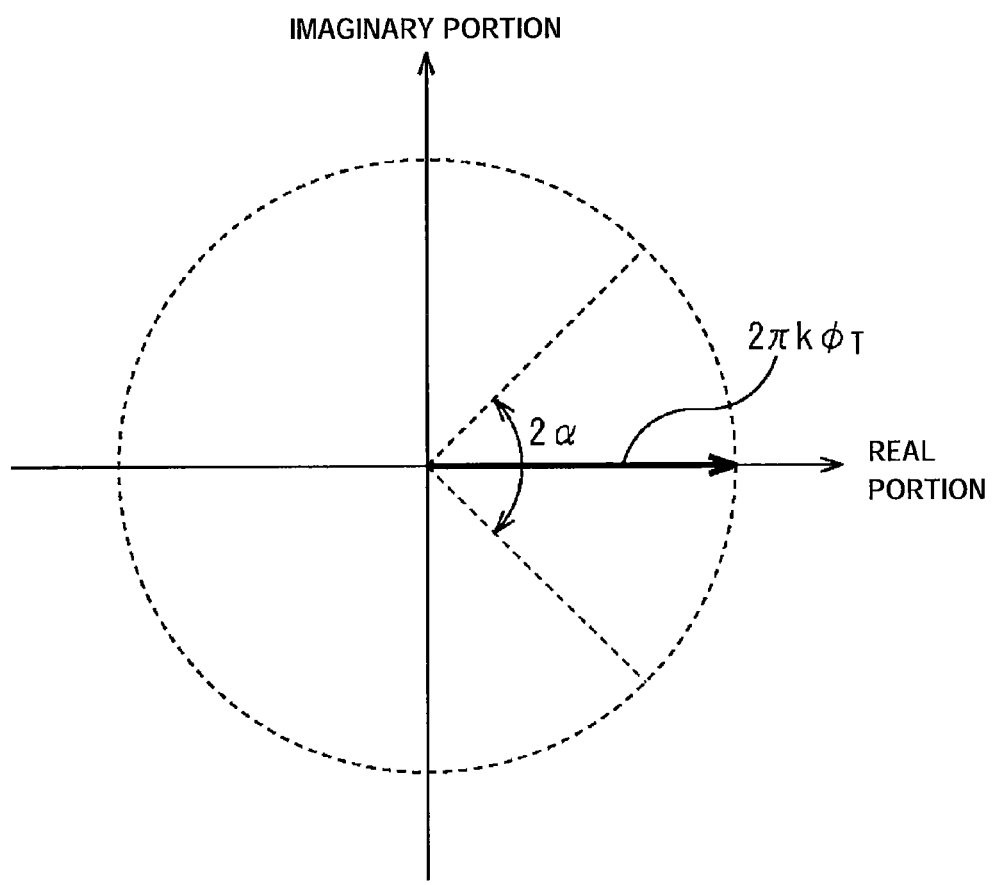
FIG. 14 is a diagram for explaining the phase of an alias component for obtaining a super-resolution effect.

As previously explained, the phase of each alias component rotates by the interval of 2πkφT. Equation (8) shows that the super-resolution effect is not obtained when the phase rotation interval of the alias component of each order is near a multiple of 2n. This is because, as shown in FIG. 14, the fact that the phase rotation interval is near a multiple of 2π means that the phase of the alias component does not change much even when the time t changes and the alias component is not cancelled, but remains.

Figure 15:
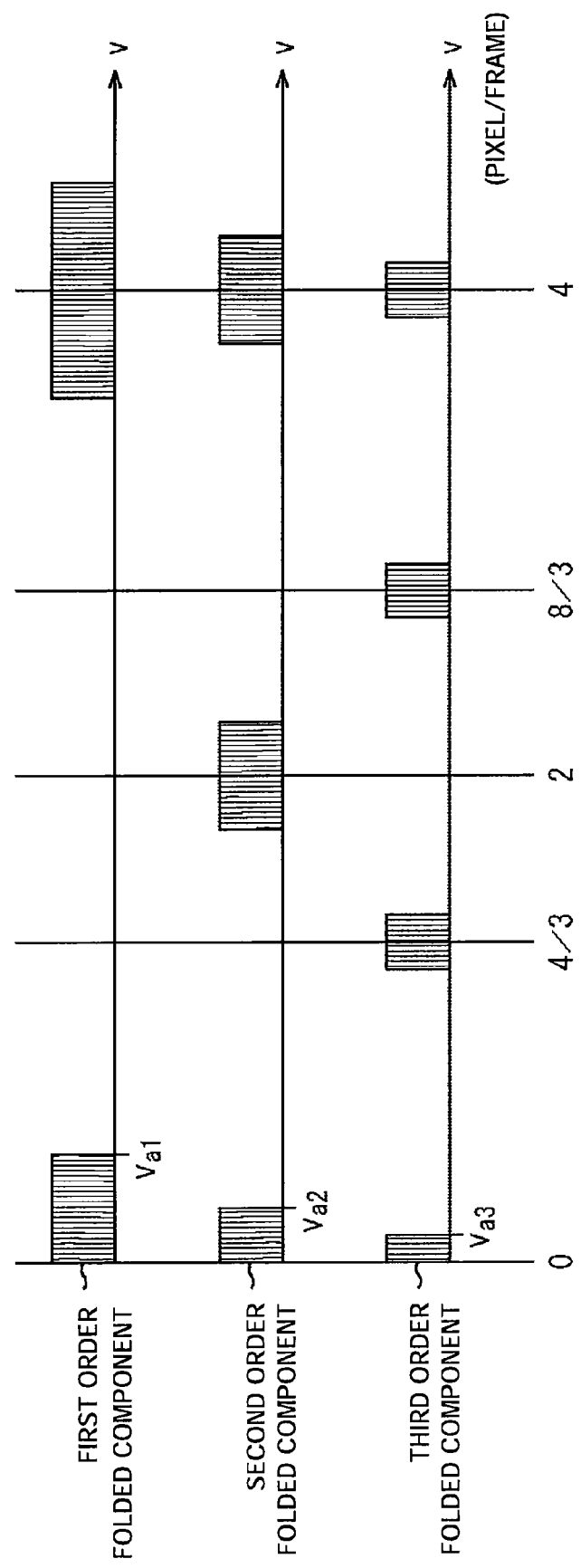
FIG. 15 is a diagram showing a velocity range where the super-resolution effect cannot be obtained.

For example, when investigating the condition for establishing equation (8) for the first to third order alias components generated when m=4, within the range of the movement velocity v (pixel/frame) shown shadowed in FIG. 15, equation (8) does not stand, and the super-resolution effect cannot be obtained.

For the first order alias components, for example, when v=4, the phase rotation interval of the alias components becomes equal to 2π×1×(4/4) (2πkφT), and the phase rotation interval of the alias components becomes equal to 2.π., therefore, within a constant range around the velocity v=4 (the range of velocity where the phase rotation interval becomes the range of the velocity within a range of 2α about the multiple of 2φ), the alias components of the primary equation are no longer cancelled. Namely, when v=4n (n=0, 1, 2, 3, . . . ), the phase rotation interval becomes n times 2π, therefore, within the constant range around v=4n, the alias components of the primary equation are not cancelled.

For the second order alias components, for example, when v=2, the phase rotation interval becomes equal to 2π×2×(2/4) (one time of 2π), then, when v=4, the phase rotation interval becomes equal to 2π×2×(4/4) (two times of 2π), therefore, within a constant range around the velocity v=2, 4 (the range of the velocity where the phase rotation interval becomes the range of 2α about the multiple of 2π), the alias components of the secondary equation are no longer cancelled. Namely, when v=2n, the phase rotation interval becomes n times 2n, therefore, within the constant range around v=2π, the alias components of the secondary equation are not cancelled.

For the third order alias components, for example, when v=4/3, the phase rotation interval becomes equal to 2π×3×(4/3)/4 (equal to 2π), while when v=8/3, the phase rotation interval becomes equal to 2π×3×(8/3)/4 (2 times 2π), and, when v=4, the phase rotation interval becomes equal to 2π×3×4/4(3 times 2π). Therefore, within a constant range about the velocity v=4/3, 8/3, 4 (the range of the velocity where the phase rotation interval becomes the range of 2α about a multiple of 2π), the alias components of the third order equation are no longer cancelled. Namely, when v=(4/3)n, the phase rotation interval becomes n times 2π, therefore, within a constant range around v=(4/3)n, the alias components of the third order equation are not cancelled.

Note that when the velocity v=0, the phase rotation interval 2πkφT becomes equal to 0, therefore, each of the first to third alias components is no longer cancelled in the constant range near v=0 (0 to vα1, 0 to vα2, 0 to vα3).

Figure 16:
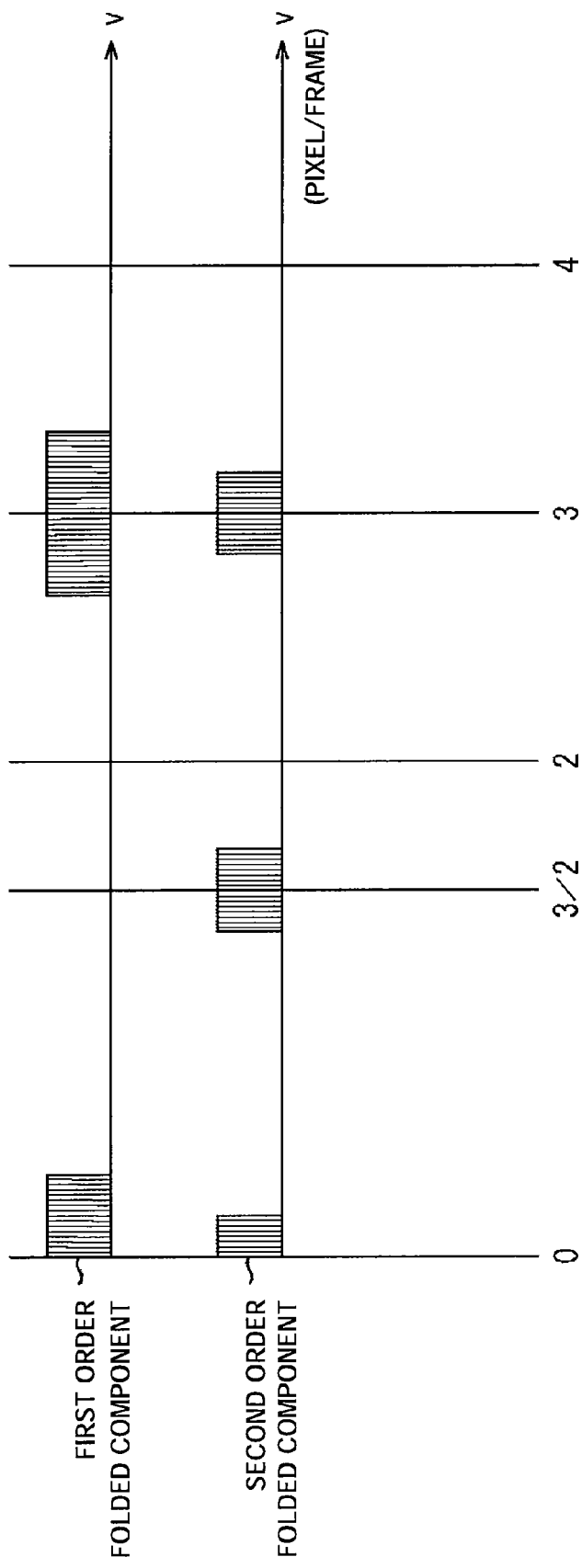
FIG. 16 is another diagram showing a velocity range where the super-resolution effect cannot be obtained.
Figure 17:
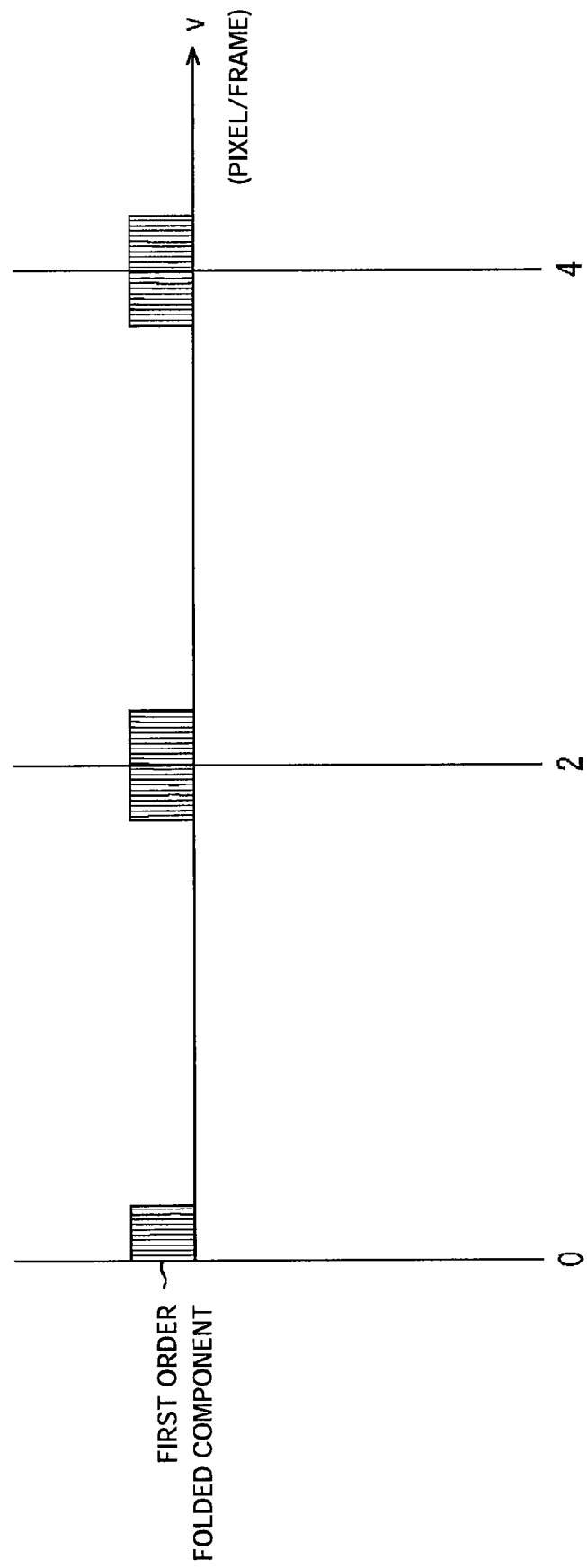
FIG. 17 is another diagram showing a velocity range where the super-resolution effect cannot be obtained.

Also for the first and second order alias components existing when m=3 (FIG. 16) and the first order alias components existing when m=2 (FIG. 17), as explained above by taking m=4 as an example, the alias components in each order equation are not cancelled at a velocity where the phase rotation interval becomes within the range of 2α about a multiple of 2π.

Further, as shown in FIG. 13, along with the rise of the order of the alias components, the phase rotation interval in each order becomes larger like 2 times and 3 times. When the phase rotation interval is θ, the movement velocity v of the subject images Wa is small. When the phase rotation interval θ is smaller than α, Equation (8) does not stand and the super-resolution effect is not obtained. When the movement velocity v of the subject images Wa rises and the phase rotation interval reaches .alpha., the super-resolution effect is obtained. From this fact, .alpha. is considered to be the critical point enabling the super-resolution effect (phase rotation interval). This .alpha. changes according to the display image frame rate and tends to become smaller when the display image frame rate is high. Where the movement velocity of the subject images Wa at the critical point is vα, equation (9) is obtained. When modifying this, equation (10) is obtained. Accordingly, when the display image frame rate becomes high and a becomes small, the velocity vα (vα1, vα2, or vα3 in the case of the example of FIG. 15) becomes small, and as a result, the super-resolution effect is obtained even when the amount of movement is small.

$$\alpha = 2\pi k \frac{v_a}{m} \tag{9}$$

$$v_a = \frac{\alpha}{2\pi} \frac{m}{k} \tag{10}$$

Further, from equation (10), vα at the critical point depends upon the subsampling amount m and the order k of the alias components. It is seen that, when the subsampling amount m becomes large, also the velocity $v\alpha$ of the critical point becomes large. Further, when the order k becomes large, the velocity $v\alpha$ at the critical point becomes small (in the case of the example of FIG. 15, $v\alpha2$ is smaller than $v\alpha1$, and $v\alpha3$ becomes smaller than $v\alpha2$). Therefore it is seen that the region not enabling the super-resolution effect in the high order alias components becomes narrow.

Summarizing the above explanation, the following may be said about the super-resolution effect in the vision system.

The critical point $\alpha$ enabling the super-resolution effect becomes small in a high frame rate display.

When the subsampling amount is m, the first to m−1-th order alias components must satisfy equation (8).

When the subsampling amount $\overline{m}$ becomes small, the velocity $v\alpha$ of the subject images $\overline{W}a$ at the critical point becomes small (when the subsampling amount $\overline{m}$ is small, the super-resolution effect is obtained even when the amount of movement is small).

From the above description, it can be seen that the super-resolution effect can be realized by subsampling in accordance with the movement velocity (magnitude and direction) of the subject.

Note that making the display image frame rate high in this way is advantageous in order to obtain the super-resolution effect, but if making the display image frame rate high, this is also advantageous for reducing deterioration of image quality such as blurring and jerkiness.

As explained above, in human vision, when a displayed subject moves on a display screen by a certain velocity and he tracks that, he perceives the image as the integration of light striking his retina within a constant time. By utilizing this time integration effect and applying spatial subsampling to the image, the image can be compressed. In the image processing apparatus of the present embodiment shown below, by utilizing this effect for CG rendering and rendering an object having movement on the rendering screen by subsampling, the rendering time is shortened. Further, in the image processing apparatus of the present embodiment, unlike the conventional technique, the pixel to be processed is chosen not on the three-dimensional space, but on the rendering image, therefore this apparatus can be utilized for many rendering techniques not limited to the raytracing method.

<Super-Resolution Effect and Rendering>

According to Bloch's law, one of the laws of human vision, when the detection threshold of stimulus is I and the duration is T, the product thereof is constant. Namely, as previously explained, "IT=k" stands. The maximum time when this law stands is called the critical time. That is, a human cannot separate and recognize light given in a constant time. Even when an image obtained by subsampling an original image for a shorter time than the critical time is presented, when the eye moves on the display screen at a constant velocity, an image obtained by integration of the light on the retina is recognized. Therefore, the alias components resulting from subsampling are cancelled, and an image same as the original image is recognized by the human. This will be called the "super-resolution effect". The super-resolution effect is generated when a target moving at a certain constant velocity is tracked.

When performing CG rendering, under conditions where the super-resolution effect is generated, even when the pixels are thinned and rendered, an image no different from that at the time when all pixels are rendered is recognized by the observer. Therefore, the technique is useful in for example a case where a CG video is displayed with a high frame rate.

Figure 18:
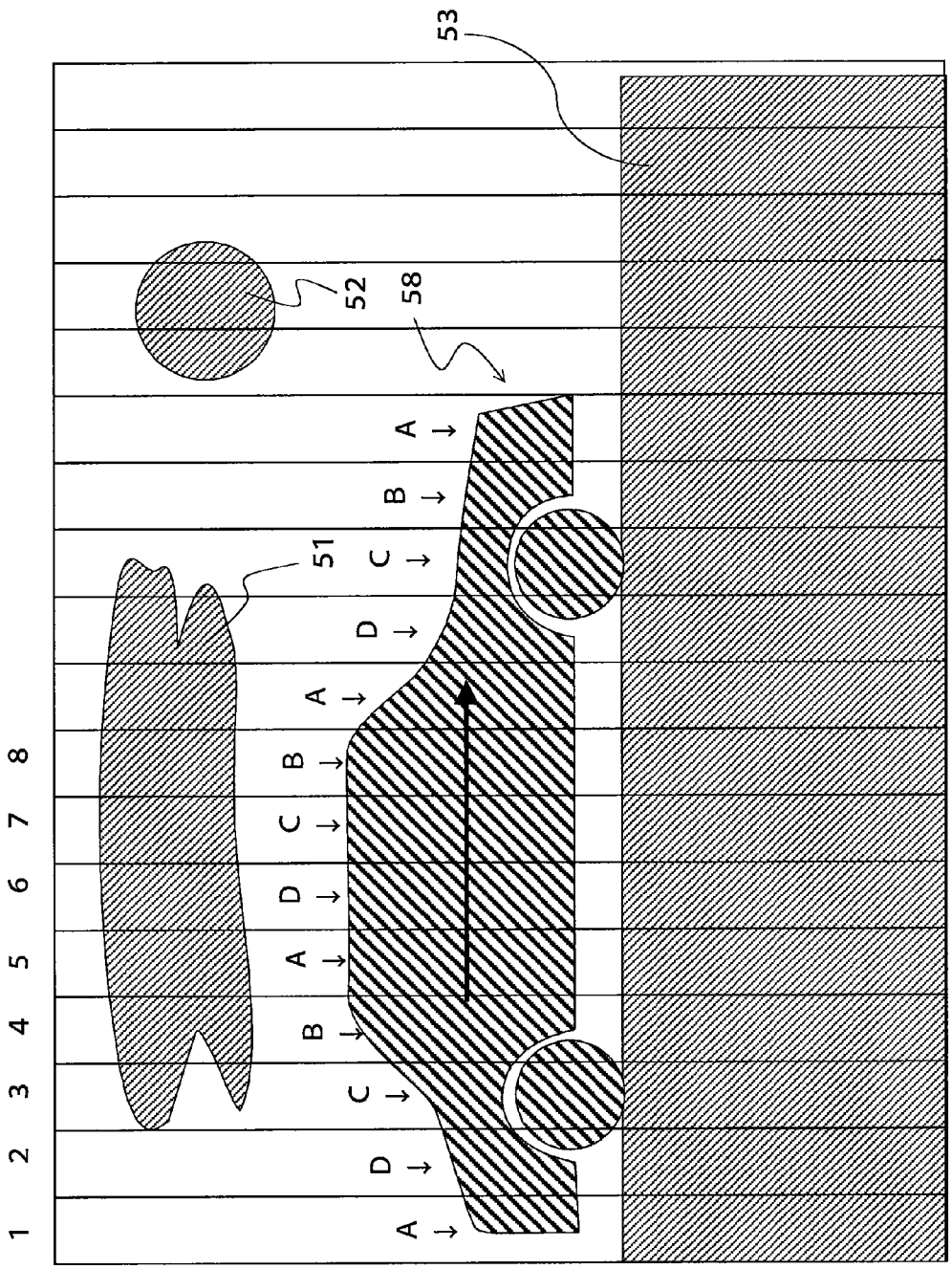
FIG. 18 is a diagram for explaining an example of the super-resolution effect.

FIG. 18 shows an example of the CG obtained by rendering all pixels. Assume that the background images 51, 52, and 53 are stationary on the screen, and a target image 58 moves in a direction indicated by the arrow. At this time, if assuming that the target image 58 satisfies the super-resolution conditions, the observed image does not change even if the image is displayed by subsampling.

Figure 19:
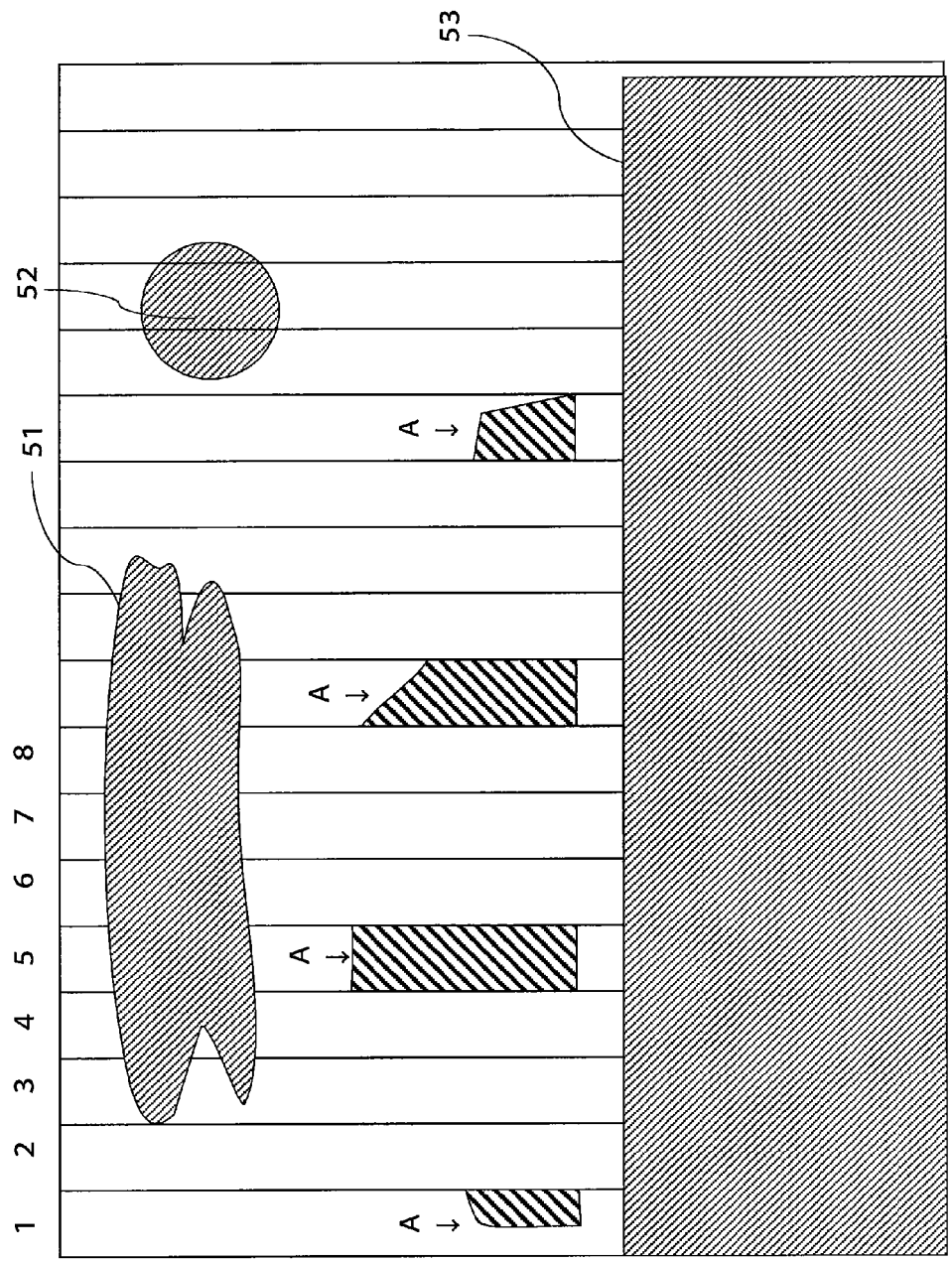
FIG. 19 is a diagram for explaining an example of the super-resolution effect.
Figure 20:
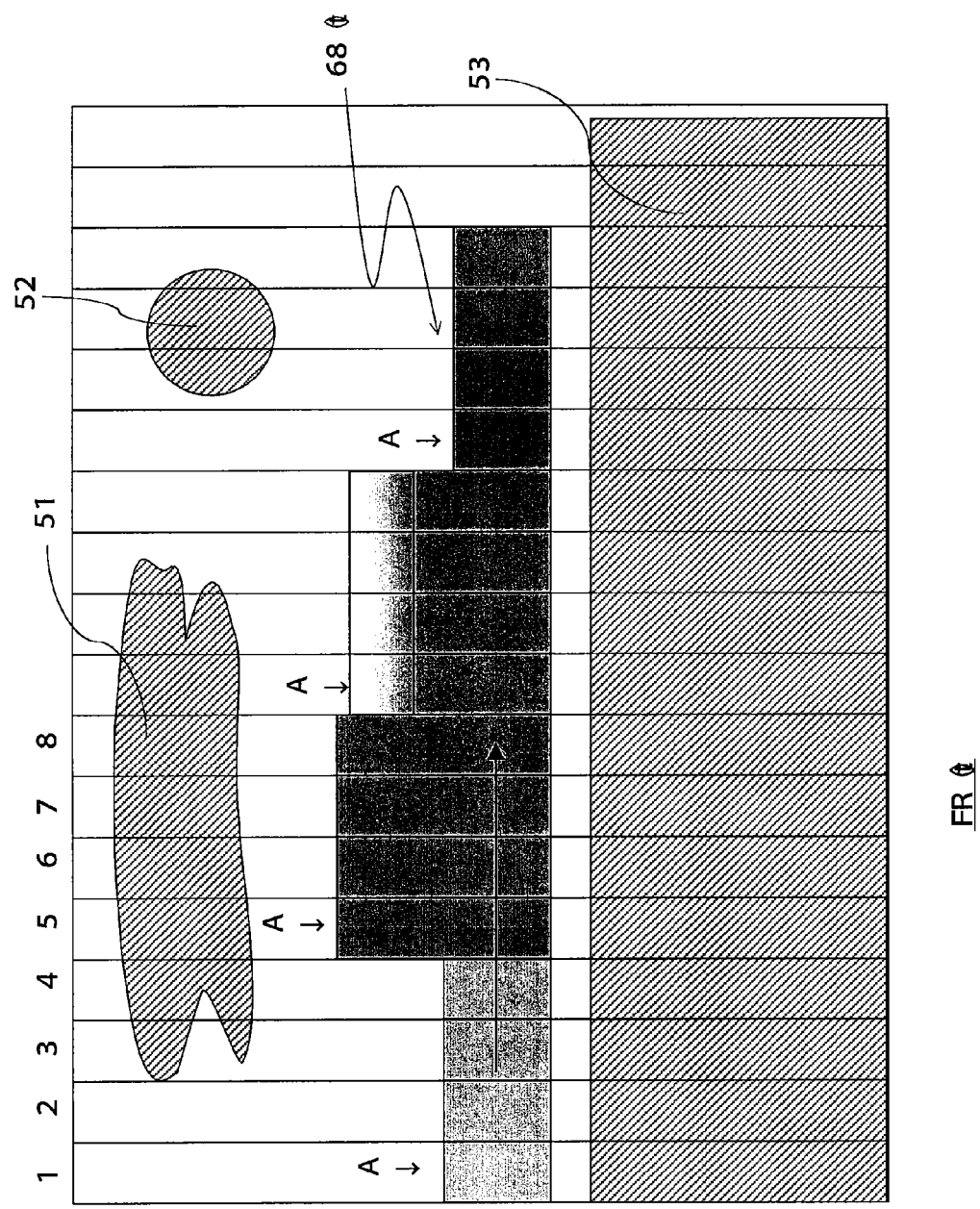
FIG. 20 is a diagram for explaining an example of the super-resolution effect.

FIG. 19 shows one image obtained by subsampling and rendering. Here, the subsampling is carried out for each four pixel data in the movement direction of the target image 58. Into the thinned pixel data, a value of the adjacent pixel data which is not thinned is copied and assigned. In the present embodiment, as the thinned pixel data, use is made of the pixel (image) data existing on the left side, but not thinned. The rendering data formed in this way is shown in FIG. 20. It is seen that the target image 58 is stretched and becomes a target image 68.

Figure 21:
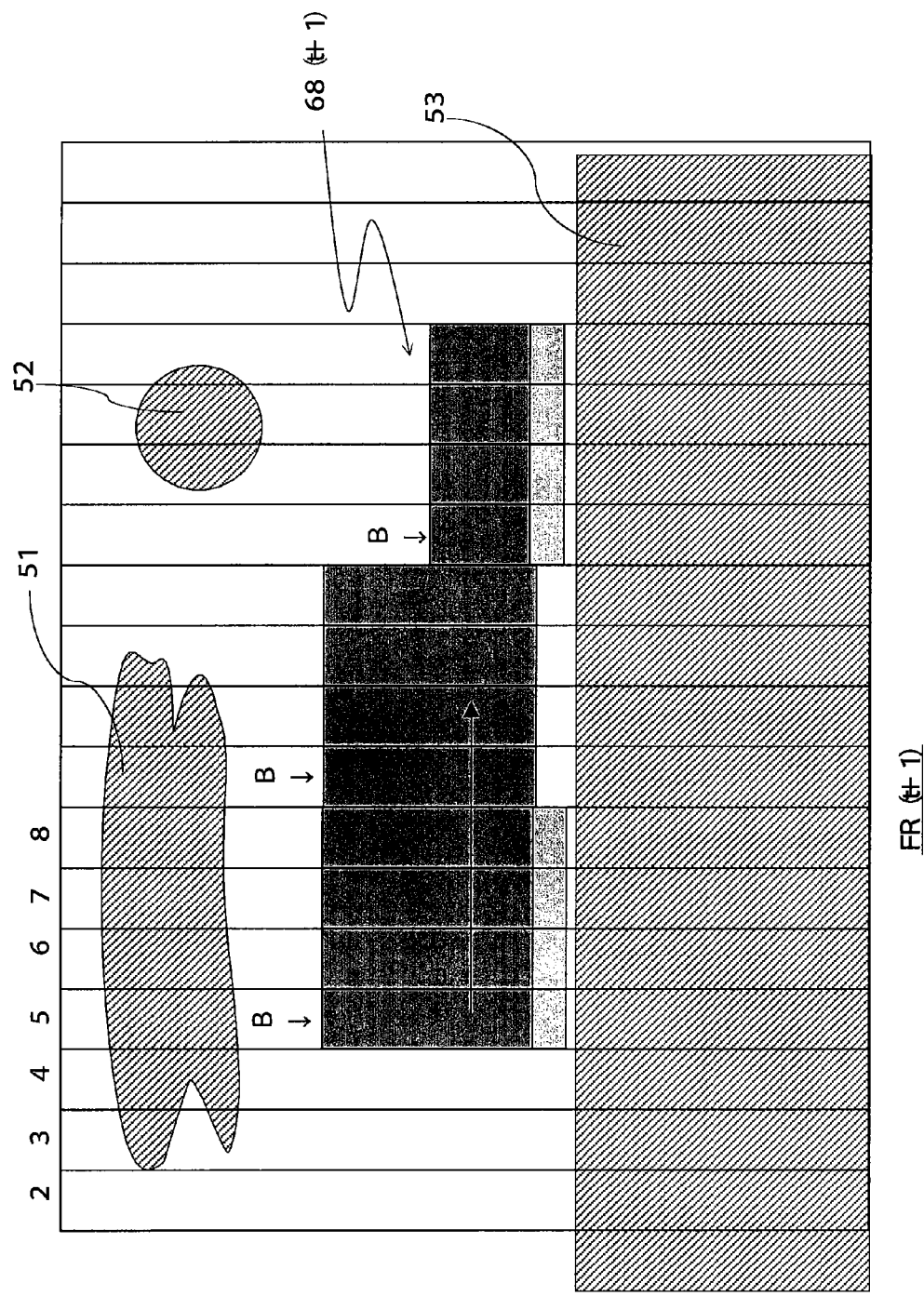
FIG. 21 is a diagram for explaining an example of the super-resolution effect.
Figure 22:
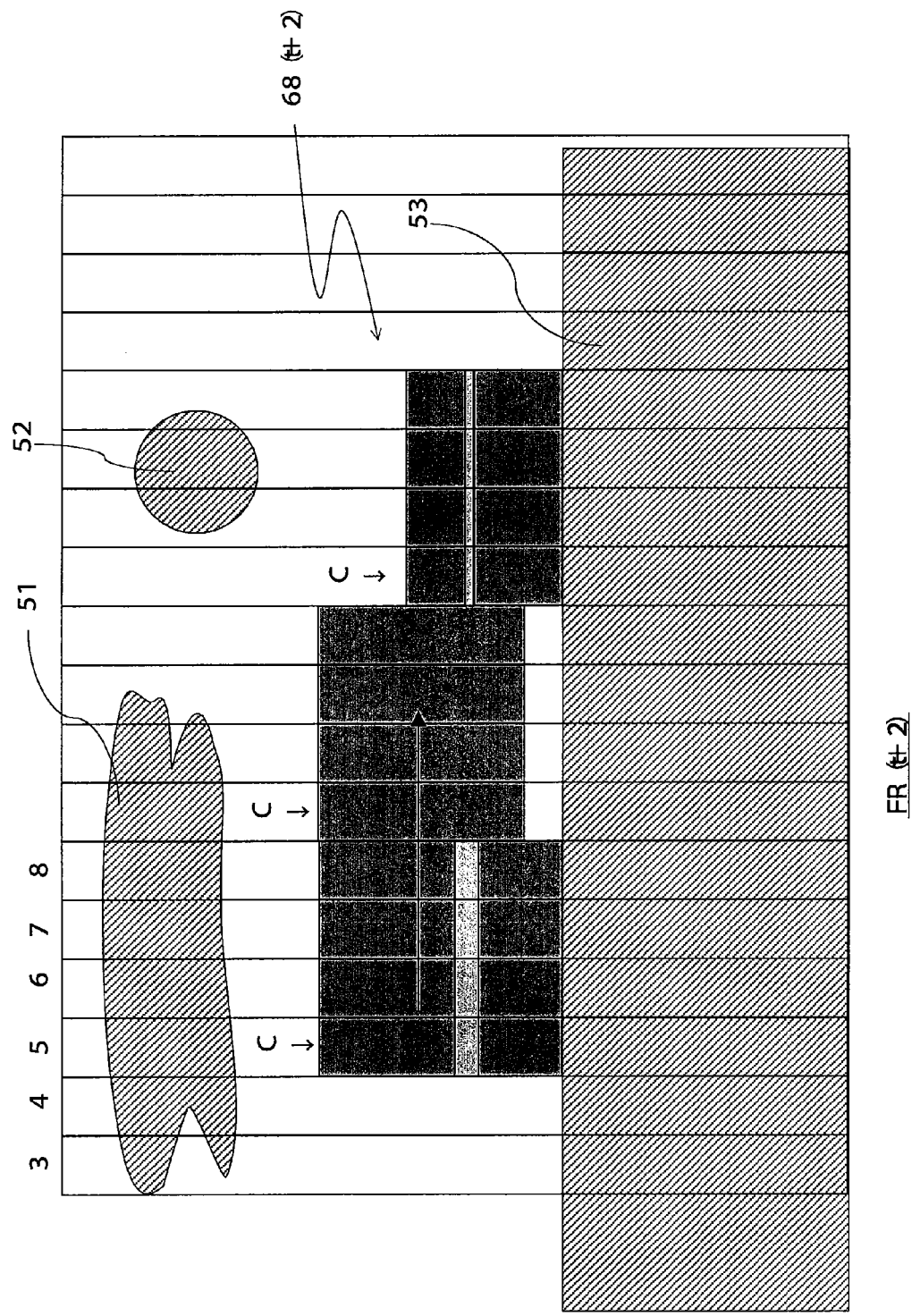
FIG. 22 is a diagram for explaining an example of the super-resolution effect.
Figure 23:
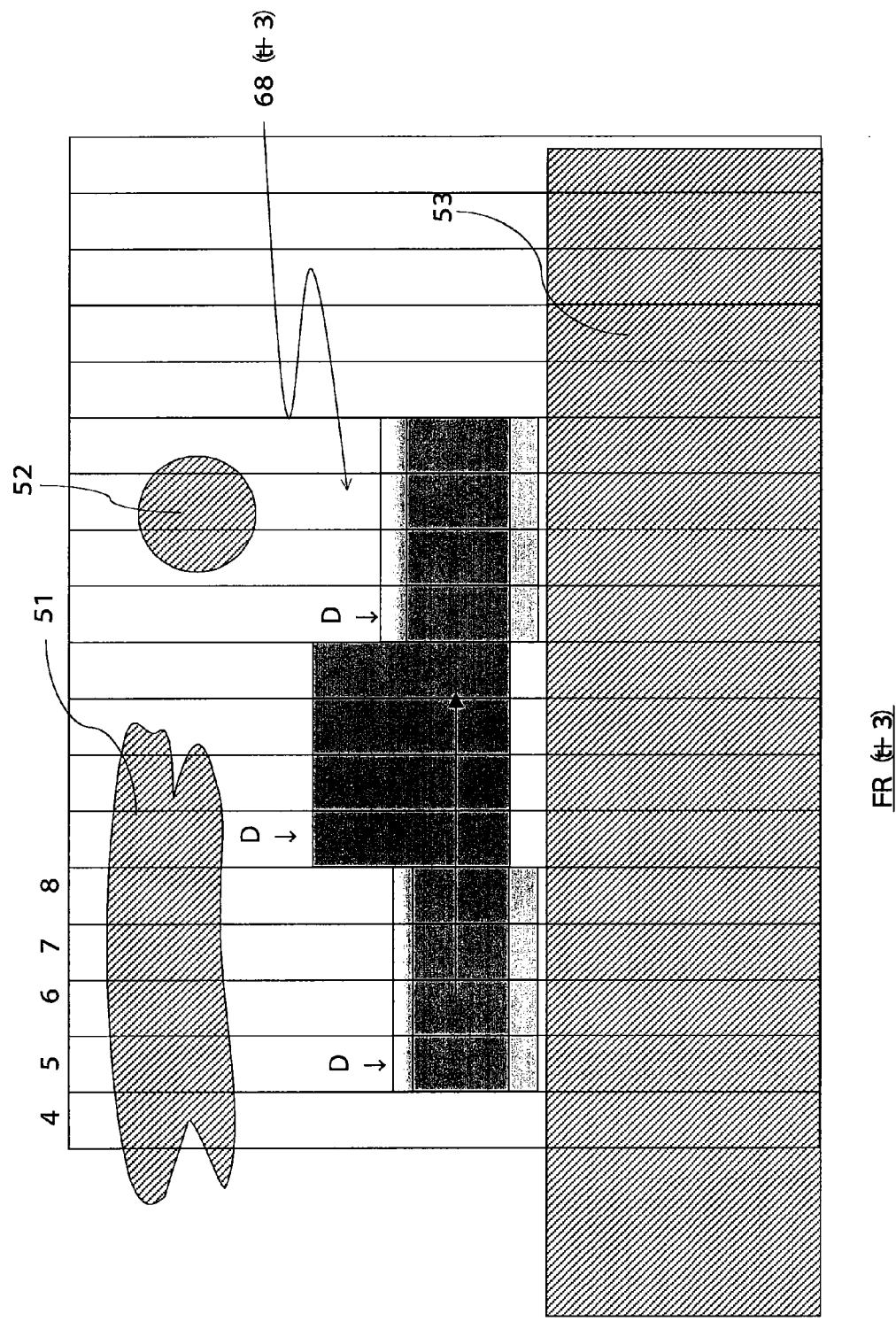
FIG. 23 is a diagram for explaining an example of the super-resolution effect.
Figure 24:
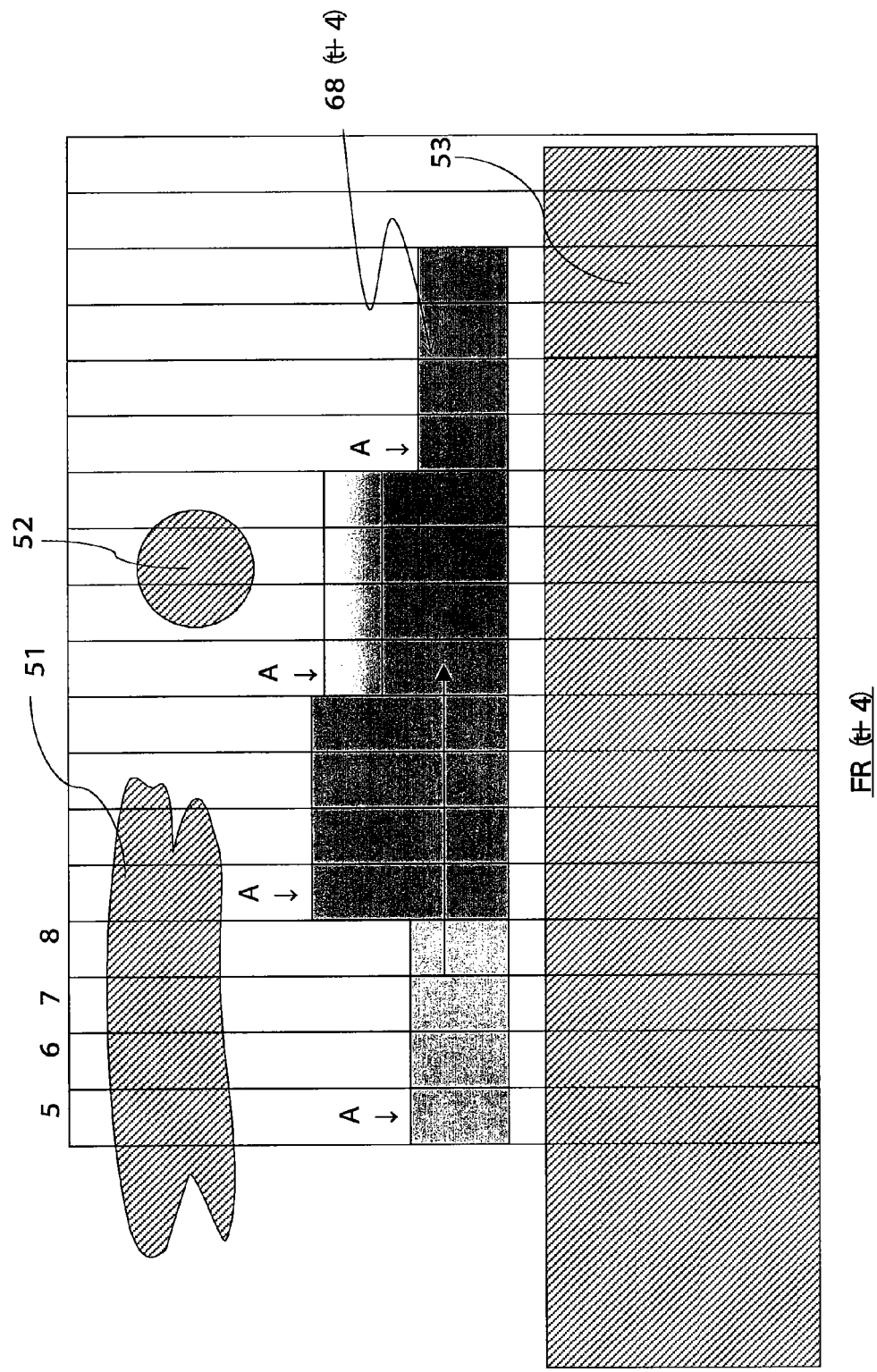
FIG. 24 is a diagram for explaining an example of the super-resolution effect.

In the image processing apparatus of the present embodiment, in the rendering of the frame data FR(t), the image (pixel data) A of FIG. 18 is rendered, the result is copied, and the image data shown in FIG. 20 is written into the display memory. Further, in the image processing apparatus, in the rendering of the frame data FR(t+1), the image (pixel data) B of FIG. 18 is rendered, the result is copied, and the image data shown in FIG. 21 is written into the display memory. Further, in the image processing apparatus, in the rendering of the frame data FR(t+2), the image (pixel data) C of FIG. 18 is rendered, the result is copied, and the image data shown in FIG. 22 is written into the display memory. Further, in the image processing apparatus, in the rendering of the frame data FR(t+3), the image (pixel data) D of FIG. 18 is rendered, the result is copied, and the image data shown in FIG. 23 is written into the display memory. Further, in the image processing apparatus, in the rendering of the frame data FR(t+4), the image (pixel data) A of FIG. 18 is rendered again, the result is copied, and the image data shown in FIG. 24 is written into the display memory.

Figure 25:
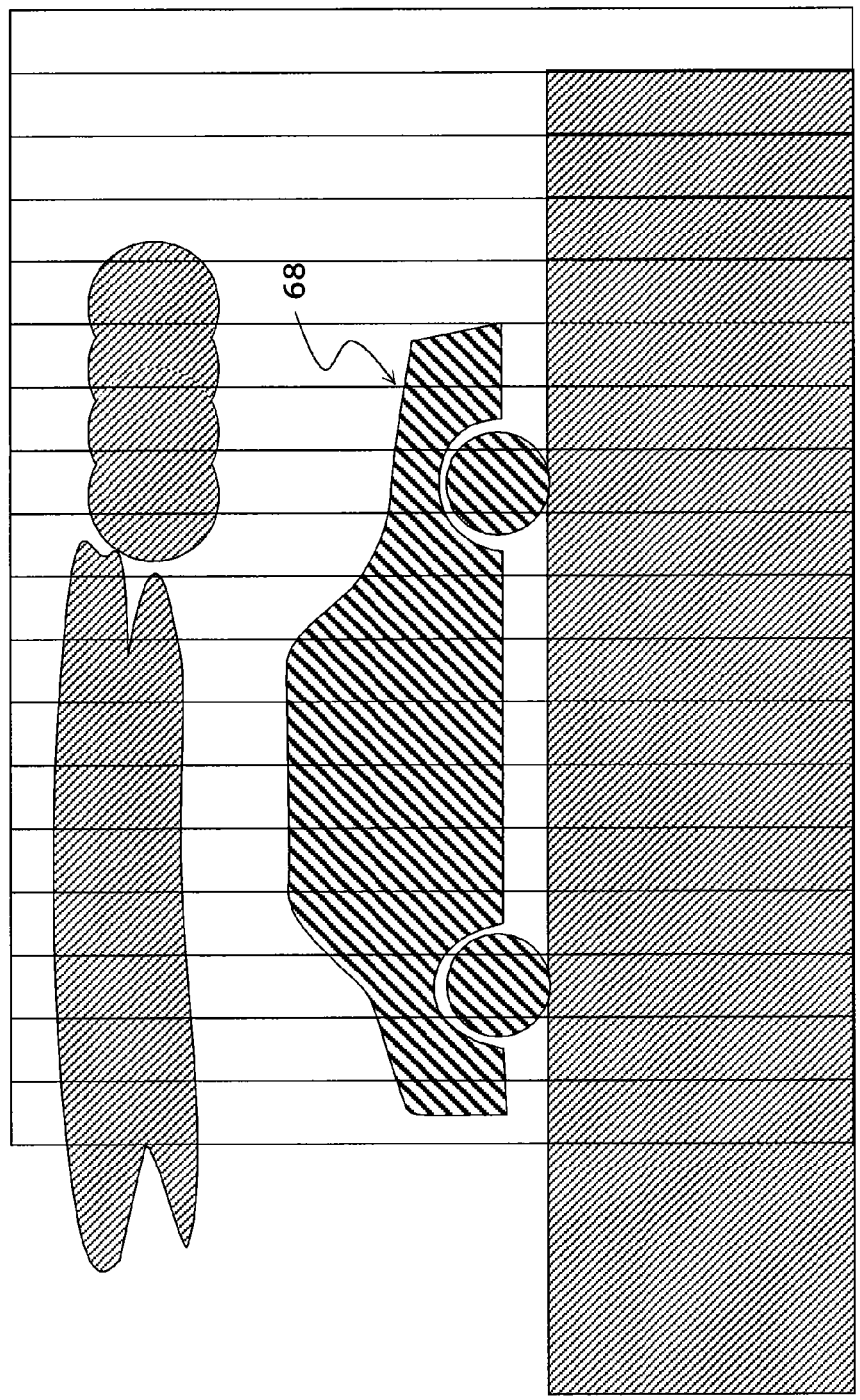
FIG. 25 is a diagram for explaining an example of the super-resolution effect.

When tracking and viewing the images 68($t$) to 68($t$+4) by the naked eye in response to the image data written in the display memory as in FIG. 20 to FIG. 24, if the light strikes the retina within the critical time, the value obtained by integrating the light is recognized by the observer. Therefore, as a result, the image 68 shown in FIG. 25 will be recognized, and an image no different from that in the case where all pixels are rendered and observed as shown in FIG. 18 is recognized.

In this way, for a moving target, the number of pixels to be rendered may be reduced in comparison with the case where all pixels are rendered, but the portions of the background images 51, 52, and 53 do not move, therefore the super-resolution effect is not generated. For such portions, not thinned rendering, but full pixel rendering is carried out, but the change in the time direction is small, therefore, by reducing the number of times of rendering in the time direction, it is also possible to reduce the rendering time.

<Image Processing Apparatus of Present Embodiment>

Figure 27:
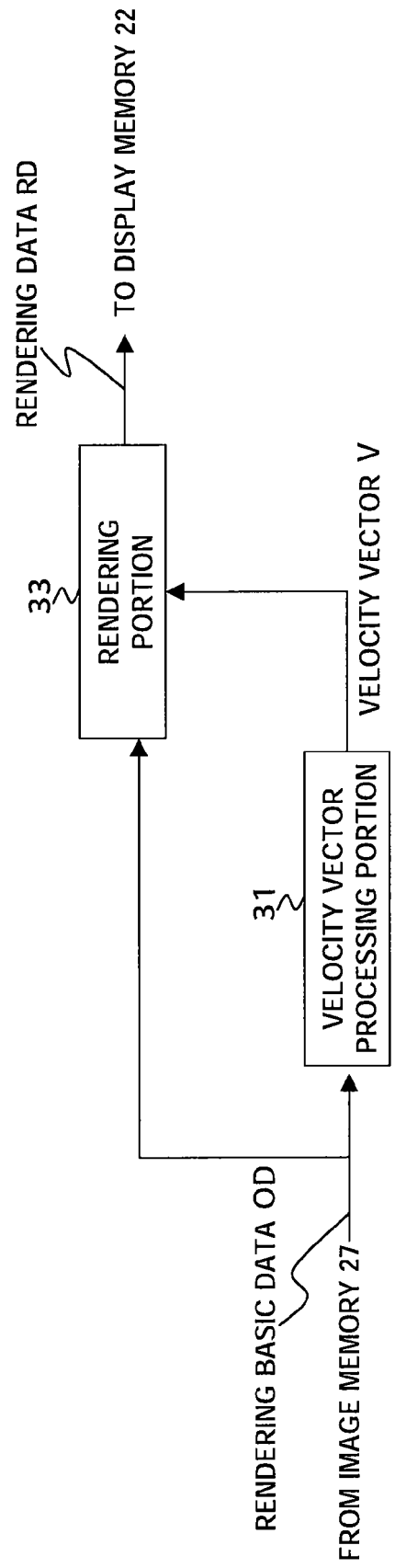
FIG. 27 is a view of the configuration of a graphic engine shown in FIG. 26.

Below, an image processing apparatus according to the embodiment of the present invention will be explained. First, the correspondence between the configuration of the present embodiment and the configuration of the claims will be explained. A velocity vector calculation unit 31 shown in FIG. 27 is an example of the velocity vector detecting device of the claims, and a rendering unit 33 is an example of the control device of the claims. Further, the processing of the velocity vector calculation unit 31 generating the velocity vector V is an example of the first step and the first routine of the claims. Further, the processing of FIG. 28 and FIG. 29 performed by the rendering unit 33 is an example of the second step and second routine of the claims. Further, rendering data RD of the present embodiment is an example of the rendering data of the claims, and rendering basic data OD of the present embodiment is an example of the rendering basic data of the claims.

Figure 26:
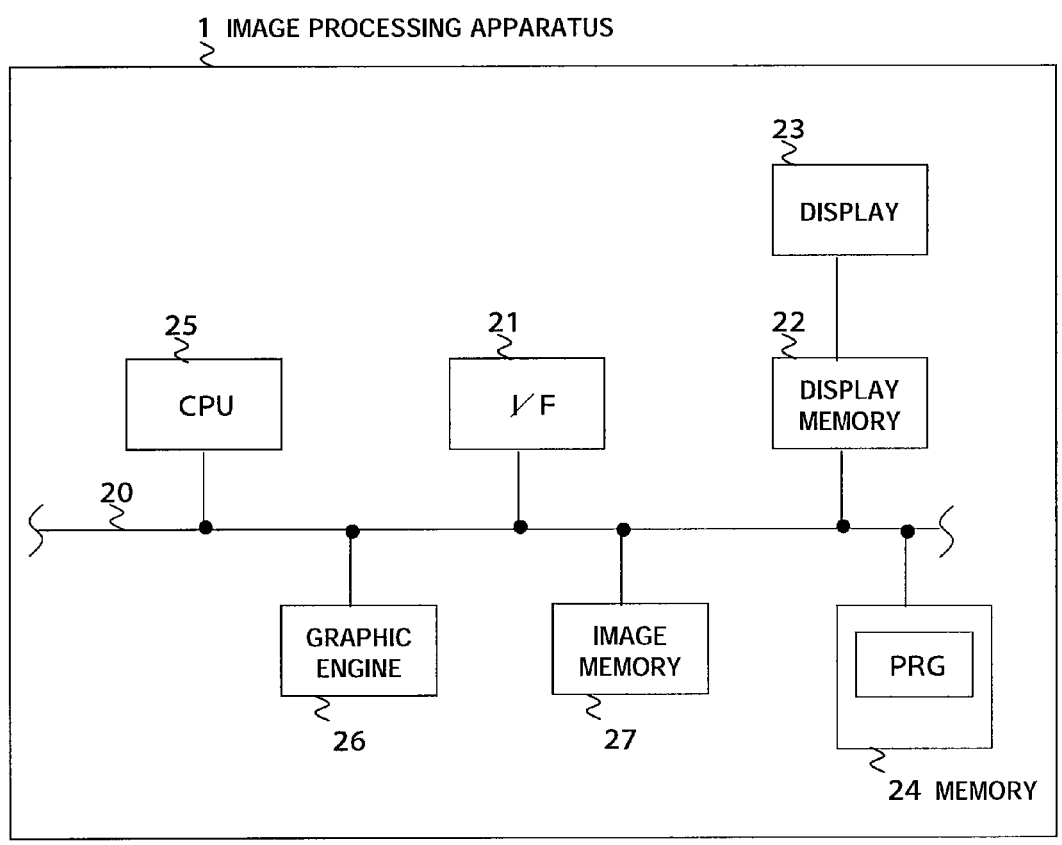
FIG. 26 is a view of the configuration of an image processing apparatus according to an embodiment of the present invention.

FIG. 26 is a view of the configuration of an image processing apparatus 1 according to the embodiment of the present invention. As shown in FIG. 26, the image processing apparatus 1 has for example an interface 21, display memory 22, display 23, memory 24, CPU 25, graphic engine 26, and image memory 27 all connected via a data line 20.

The image processing apparatus 1 performs the rendering by subsampling in the graphic engine 26 so that the observer does not recognize any deterioration in image quality, reduces the amount of processing, and shortens the processing time and reduces the circuit size.

The interface 21 receives as input the rendering basic data etc. from outside of the image processing apparatus 1 and writes this into the image memory 27.

In the display memory 22, the rendering data is written by the graphic engine 26. The display 23 displays an image in accordance with the rendering data stored in the display memory 22.

The memory 24 stores a program PRG defining the processing of the CPU 25 and the graphic engine 26. The CPU 25 centrally controls the operation of the image processing apparatus 1 based on the program PRG stored in the memory 24. The graphic engine 26 performs the rendering explained later based on the program PRG stored in the memory 24.

Below, a detailed explanation will be given of the graphic engine 26. FIG. 27 is a view of the configuration of the graphic engine 26 shown in FIG. 26. As shown in FIG. 27, the graphic engine 26 has for example a velocity vector calculation unit 31 and rendering unit 33.

The velocity vector calculation unit 31 and the rendering unit 33 may be configured by electronic circuits or may be configured by the program PRG run by the graphic engine 26.

[Velocity Vector Calculation Unit 31]

The velocity vector calculation unit 31 computes to which point on the image plane the target image is mapped for each frame based on the rendering basic data OD so as to thereby generate a velocity vector V of the target image within the image to be rendered and outputs this to the rendering unit 33. The velocity vector calculation unit 31 generates the velocity vector V in units of for example block data comprised by $\underline{m}$ number of pixel data.

The rendering basic data OD is information necessary for CG rendering and shows for example a transform matrix between coordinate systems such the global coordinate system or camera coordinate system or the coordinate system on the rendering image plane, polygon data or the material component of the target, the type, direction, and position of a light source, an image angle, direction, and location of the camera, and an image size to be rendered. The velocity vector calculation unit 31 generates the velocity vector V by using the transform matrix between coordinate systems indicated by the rendering basic data OD.

[Rendering Unit 33]

The rendering unit 33 selects the pixel data to be rendered on the rendering image, performs the rendering with respect to only that pixel data, and copies the value of the rendered pixel data for the pixel data not to be rendered. The rendering unit 33 judges whether or not the block data to be processed satisfies the super-resolution conditions based on the velocity vector V input from the velocity vector calculation unit 31. Then, the rendering unit 33 performs the subsampling of the rendering when judging that the super-resolution conditions are satisfied.

The rendering unit 33 judges whether or not the super-resolution conditions are satisfied as previously explained. Namely, the amount of deviation $\phi$ of the sampling point is defined by the above equation (4) where the velocity on the rendering image is V (pixel/frame) and the subsampling amount is $\underline{m}$ (pixel). Here, T is the time interval and the reciprocal of the frame rate. At this time, satisfaction of the above equation (5) is the condition of generation of super-resolution. As previously explained, when developing the above equation (5) according to Euler's equation, the above equations (6) and (7) may stand.

The rendering unit 33 decides that the super-resolution generation condition is satisfied where above equations (6) and (7) stand within the critical duration.

The rendering unit 33 judges whether or not the above super-resolution generation condition is satisfied for each above block data, performs the rendering for only one pixel data in the block data for block data judged to satisfy the super-resolution conditions, does not render the other pixel data, and assigns a copy of the above rendered pixel data instead. Namely, the rendering unit 33 performs the rendering only for one pixel data for each pixel data having the subsampling amount of $\underline{m}$ when judging that the above super-resolution conditions are satisfied. Note that, the rendering unit 33 performs control so as to newly generate pixel data at pixel positions different from each other for the block data to be subjected to the above subsampling among a plurality of frame images which are continuously displayed as explained by using FIG. 20 to FIG. 25. Due to this, the previously explained super-resolution effect can be obtained.

Note that, the rendering unit 33 may assign a previously determined fixed value data as the above other pixel data in the block data to be thinned.

The rendering unit 33 renders all pixel data in the block data for block data not satisfying the above super-resolution conditions. The rendering performed by the rendering unit 33, in the case of for example the raytracing method, finds the ray passing through each pixel of the rendering screen from the eye center for each pixel and judges the intersection with the object in the three-dimensional space.

The rendering unit 33 may perform the above subsampling by generating one pixel data for each $\underline{m}$ number of pixel data having consecutive display positions or may perform it by generating pixel data of one block data for each $\underline{m}$ number of block data each comprised of a plurality of pixel data.

Figure 28:
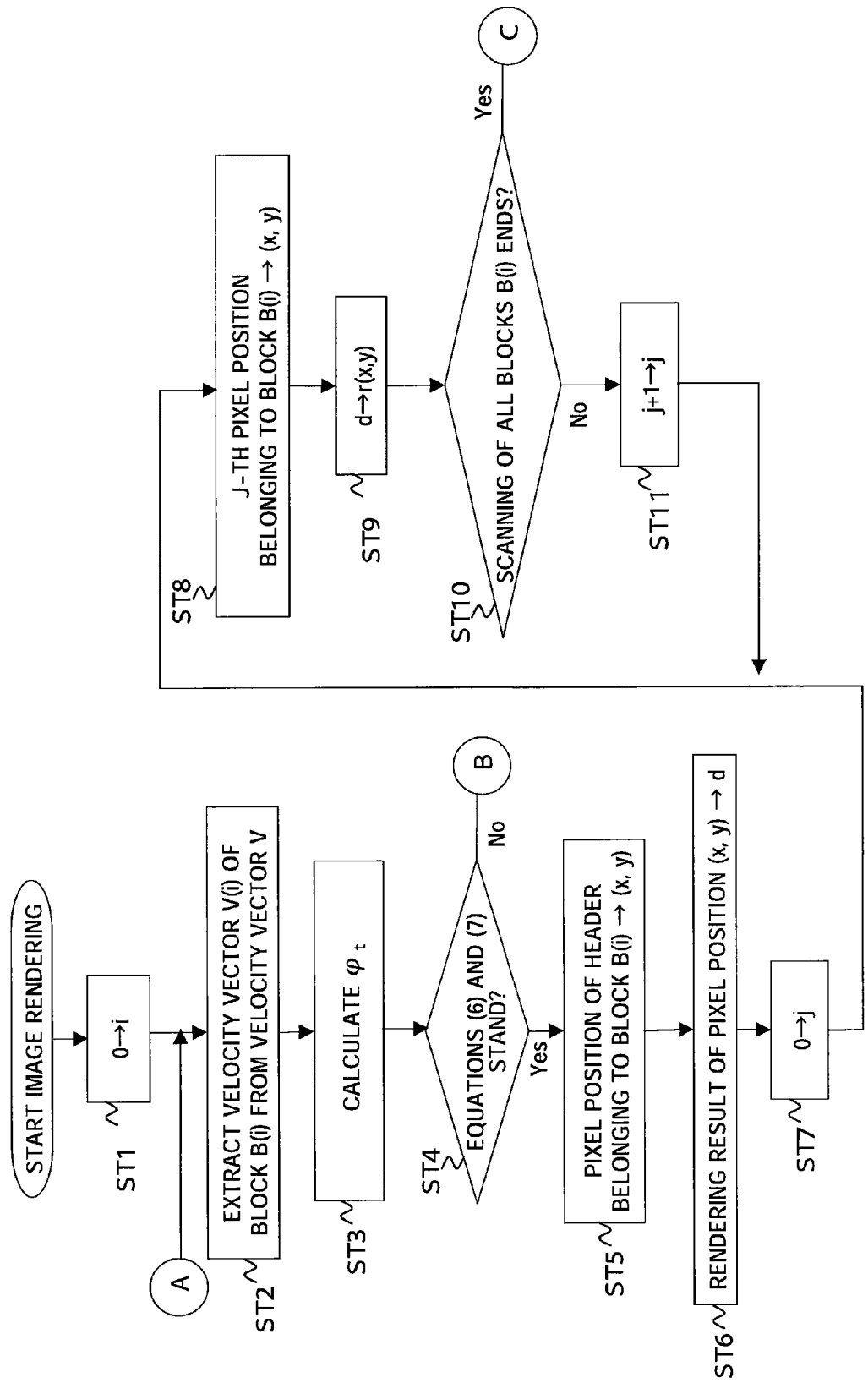
FIG. 28 is a flow chart for explaining processing for rendering individual frame data by the graphic engine shown in FIG. 27.
Figure 29:
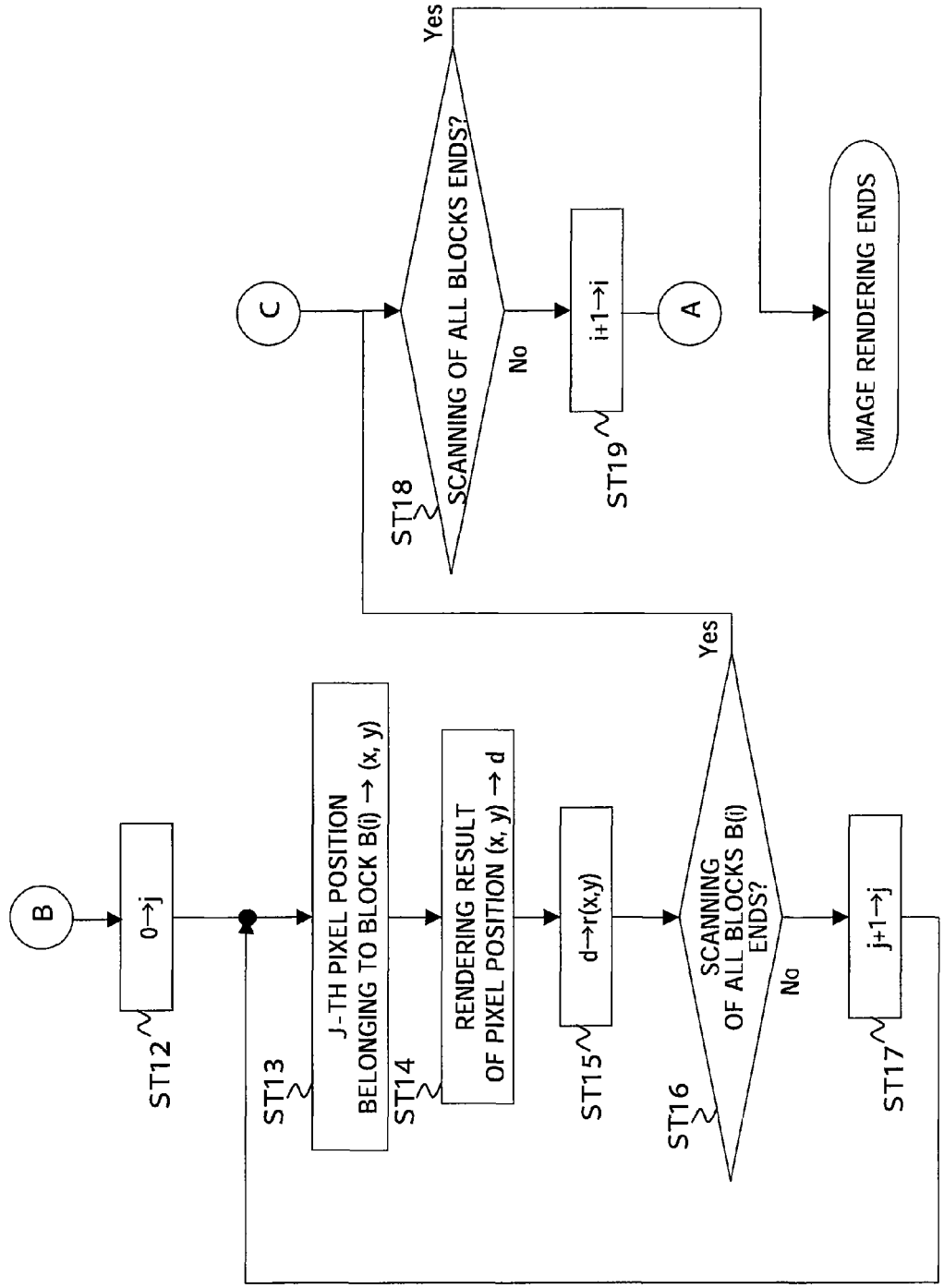
FIG. 29 is a flow chart continued from FIG. 28 for explaining the processing for rendering individual frame data by the graphic engine shown in FIG. 27.

Below, an explanation will be given of the rendering of each frame performed by the rendering unit 33. FIG. 28 and FIG. 29 are flow charts for explaining the rendering of each frame performed by the rendering unit 33. In the following explanation, the i-th block data of the frame to be processed is represented by b(i).

Step ST1

The rendering unit 33 enters the initial value "0" for the variable i.

Step ST2

The rendering unit 33 extracts a velocity vector v(i) of block data b(i) to be processed (still unprocessed) from among velocity vectors V generated by the velocity vector calculation unit 31.

Step ST3

The rendering unit 33 computes $\phi t$ by using the above equation (4) when v=v(i) based on the velocity vector v(i) specified at step ST2.

Step ST4

The rendering unit 33 decides whether or not the conditions of the above equations (6) and (7), that is, the super-resolution conditions, are satisfied (stand) based on $\phi t$ computed at step ST3. It proceeds to step ST5 when judging that the conditions are satisfied, while proceeds to step ST12 when judging that the conditions are not satisfied.

Step ST5

The rendering unit 33 enters the predetermined (header) pixel position in the block data b(i) to be processed for (x, y).

Step ST6

The rendering unit 33 reads the rendering basic data OD at the pixel position (x, y) from the image memory 27 shown in FIG. 26, performs the rendering, and enters the rendering result for the variable d.

Step ST7

The rendering unit 33 enters the initial value "0" for the variable j.

Step ST8

The rendering unit 33 enters the j-th pixel position in the block data b(i) to be processed for (x, y).

Step ST9

The rendering unit 33 enters the value of the variable d obtained at step ST6 for r(x, y) as the rendering result of the pixel position (x, y).

Step ST10

The rendering unit 33 judges whether or not r(x, y) at all pixel positions in the block data (i) to be processed are obtained (the scanning ends). It proceeds to step ST18 when judging that these are obtained, while proceeds to step ST11 when not judging so.

Step ST11

The rendering unit 33 increments the variable j by exactly 1.

Step ST12

The rendering unit 33 enters the initial value "0" for the variable j.

Step ST13

The rendering unit 33 enters the j-th pixel position in the block data b(i) to be processed for (x, y).

Step ST14

The rendering unit 33 reads the rendering basic data OD at the pixel position (x, y) from the image memory 27 shown in FIG. 26, performs the rendering, and enters the rendering result for the variable d.

Step ST15

The rendering unit 33 enters the value of the variable d obtained at step ST14 for r(x, y) as the rendering result of the pixel position (x, y).

Step ST16

The rendering unit 33 judges whether or not r(x, y) at all pixel positions in the block data (i) to be processed are obtained (the scanning ends). It proceeds to step ST18 when judging that these are obtained, while proceeds to step ST17 when not judging so.

Step ST17

The rendering unit 33 increments the variable j by exactly 1.

Step ST18:

The rendering unit 33 judges whether or not the rendering of all block data defined by the rendering basic data OD is completed (the scanning ends). It ends the processing when judging that the rendering ends, while proceeds to step ST19 when not judging so.

Step ST19

The rendering unit 33 increments the variable i by exactly 1.

The rendering unit 33, as explained by using FIG. 20 to FIG. 25, performs the subsampling and the non-subsampling processing shown in FIG. 28 and FIG. 29 so as to newly generate the pixel data at pixel positions different from each other for the block data to be subjected to the above subsampling in a plurality of frame images which are consecutively displayed. Due to this, the previously explained super-resolution effect can be obtained.

As explained above, according to the image processing apparatus 1, in the graphic engine 26 shown in FIG. 26, the amount of processing of the rendering of a moving image can be reduced to ¼. Due to this, a shortening of the rendering time and a reduction of size of the graphic engine 26 can be achieved.

Further, the processing performed by the graphic engine 26 is not a speed-increasing technique in three-dimensional space, but a method of reducing the number of pixels to be rendered on a two-dimensional plane, therefore can be used together with the other rendering speed-increasing techniques.

The present invention is not limited to the above embodiment. Namely, it should be understood by those skilled in the art that various modifications, combinations, sub-combinations and alterations may occur depending on design requirements and other factors insofar as they are within the scope of the appended claims or the equivalents thereof.

For example, in the above embodiment, "4" was exemplified as the subsampling amount $\underline{m}$, but $\underline{m}$ is not particularly limited so far as $\underline{m}$ is "2" or more.

Further, in the above embodiment, the case of writing the rendering data generated by the subsampling and non-subsampling processing into the display memory 22 shown in FIG. 26 was exemplified, but the rendering data may be written into a storage medium such as a semiconductor memory, magnetic disc, optical disc, and opto-magnetic disc for storage. Further, the above generated rendering data may be written into a transmission use buffer memory.

Figure 30:
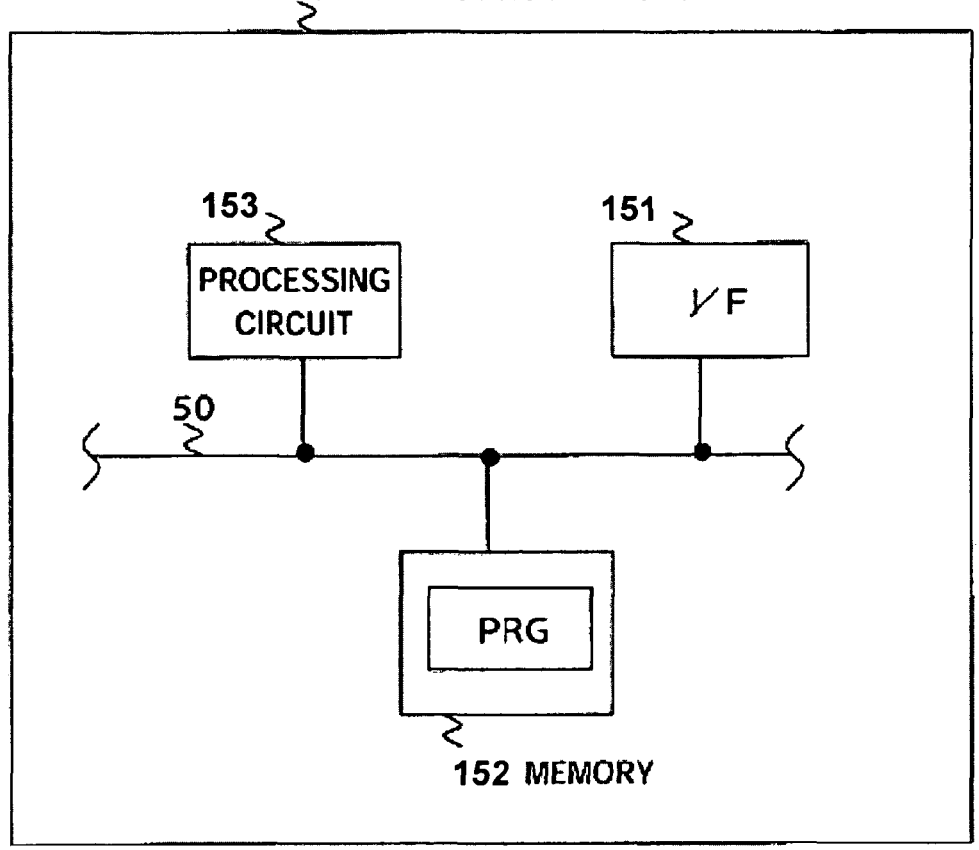
FIG. 30 is a diagram for explaining a modification of the image processing apparatus shown in FIG. 26.

For example, all or part of the functions of the CPU 25 and the graphic engine 26 of the image processing apparatus 1 shown in FIG. 26 may be realized by the processing circuit running a program. For example, as shown in FIG. 30, an image processing apparatus 1a may be configured by connecting an interface 151, a memory 152, and a processing circuit 153 by a data line 50. The image processing apparatus 1a reads out the program PRG from the memory 152 and runs it to achieve the functions of the image processing apparatus 1 explained in the above embodiment.

It should be understood by those skilled in the art that various modifications, combinations, sub-combinations and alterations may occur depending on design requirements and other factors in so far as they are within scope of the appeared claims or the equivalents thereof.

We claim:

1. An image processing method for sequentially generating rendering data of a plurality of images composing a moving image, comprising:
   a first step of detecting a velocity vector of a block image in an image using rendering basic data that includes at least a transform matrix between multiple coordinate systems; and
   a second step of selectively performing, for each of the block images of the rendering data and based on the velocity vector generated in the first step, subsampling processing for generating only part of the pixel data in the pixel data corresponding to the block image based on the rendering basic data and non-subsampling processing for generating all pixel data corresponding to the block images based on the rendering basic data to thereby generate the rendering data,
   said subsampling processing is selected when a relation among a velocity vector detected by said velocity vector detecting device, a predetermined subsampling amount, and a rate of rendering said rendering data satisfies conditions whereby all alias components generated by said subsampling processing are mutually cancelled out, and wherein the conditions for selecting said subsampling processing include satisfying equations (1), (2) and (3), $$\varphi_t = (v/m)(t/T), \quad (1)$$

$$\sum_t \cos(2\pi k\varphi_t) = 0, \quad (2)$$

$$\sum_t \sin(2\pi k\varphi_t) = 0, \quad (3)$$

where $\phi_t$ is the amount of phase deviation $\phi_t$ of a subsampling point at a time t, v is the velocity vector of the block image, m is the predetermined subsampling amount, T is the reciprocal of a frame rate of the block image, and k is the $k^{th}$ order alias component where k in an integer in a range from 1 to m−1.

2. An image processing apparatus for sequentially generating rendering data of a plurality of images composing a moving image, comprising
  a velocity vector detecting device that detects a velocity vector of a block image in an image using rendering basic data that includes at least a transform matrix between multiple coordinate systems; and
  a control device that selectively performs, for each of the block images of the rendering data and based on a velocity vector generated by the velocity vector detecting device, subsampling processing for generating only part of the pixel data in the pixel data corresponding to the block image based on the rendering basic data and non-subsampling processing for generating all pixel data corresponding to the block image based on the rendering basic data to thereby generate the rendering data,
  wherein,
  said control device selects said subsampling processing when a relation among a velocity vector detected by said velocity vector detecting device, a predetermined subsampling amount, and a rate of rendering said rendering data satisfies conditions whereby all alias components generated by said subsampling processing are mutually cancelled out, and
  the control device determines that the conditions are satisfied such that the alias components generated by said subsampling processing are mutually cancelled out based on equations (1), (2) and (3), $$\varphi_t = (v/m)(t/T), \quad (1)$$

$$\sum_t \cos(2\pi k\varphi_t) = 0, \quad (2)$$

$$\sum_t \sin(2\pi k\varphi_t) = 0, \quad (3)$$

where $\phi_t$ is the amount of phase deviation $\phi_t$ of a subsampling point at a time t, v is the velocity vector of the block image, m is the predetermined subsampling amount, T is the reciprocal of a frame rate of the block image, and k is the $k^{th}$ order alias component where k in an integer in a range from 1 to m−1.

3. An image processing apparatus as set forth in claim 2, wherein said velocity vector detecting device detects said velocity vectors in units of block data comprised of a plurality of image data, and said control device selects one of said subsampling processing and non-subsampling processing in units of said block data.

4. An image processing apparatus as set forth in claim 3, wherein said control device newly generates one image data in the block data for said subsampling processing and assigns said newly generated image data as the remaining image data.

5. An image processing apparatus as set forth in claim 3, wherein said control device newly generates one image data in the block data for said subsampling processing and assigns fixed value data as the remaining image data.

6. An image processing apparatus as set forth in claim 2, wherein said control device generates image data of different pixel positions forming said block image for said subsampling processing among a plurality of rendering data consecutively displayed.

7. An image processing apparatus as set forth in claim 2, wherein said velocity vector detecting device specifies a mapped position on a display screen based on said rendering basic data and detects said velocity vector based on said specified position.

8. An image processing apparatus as set forth in claim 2, wherein said control device performs either processing for writing said generated rendering data to the display memory, processing for transmitting it, or processing for writing it in a storage medium.

9. A non-transitory computer-readable storage medium storing a program run by an image processing apparatus for sequentially generating rendering data of a plurality of images composing a moving image, wherein the program makes the image processing apparatus execute:
  a first routine of detecting a velocity vector of a block image in an image using rendering basic data that includes at least a transform matrix between multiple coordinate systems; and
  a second routine of selectively performing, for each of the block images of the rendering data and based on the velocity vector generated in the first routine, subsampling processing for generating only part of the pixel data in the pixel data corresponding to the block image based on the rendering basic data and non-subsampling processing for generating all pixel data corresponding to the block images based on the rendering basic data to thereby generate the rendering data,
  wherein
  said subsampling processing is selected when a relation among a velocity vector detected by said velocity vector detecting device, a predetermined subsampling amount, and a rate of rendering said rendering data satisfies conditions whereby all alias components generated by said subsampling processing are mutually cancelled out, and
  wherein the conditions for selecting said subsampling processing include satisfying equations (1), (2) and (3), $$\varphi_t = (v/m)(t/T), \quad (1)$$

$$\sum_t \cos(2\pi k\varphi_t) = 0, \quad (2)$$

$$\sum_t \sin(2\pi k\varphi_t) = 0, \quad (3)$$

where $\phi_t$ is the amount of phase deviation $\phi_t$ of a subsampling point at a time t, v is the velocity vector of the block image, m is the predetermined subsampling amount, T is the reciprocal of a frame rate of the block image, and k is the $k^{th}$ order alias component where k in an integer in a range from 1 to m−1.

* * * * *